(12) United States Patent
Hurd et al.

(10) Patent No.: US 9,395,796 B2
(45) Date of Patent: Jul. 19, 2016

(54) DYNAMIC GRAPHICS GEOMETRY PREPROCESSING FREQUENCY SCALING AND PREDICTION OF PERFORMANCE GAIN

(71) Applicants: Linda L. Hurd, Cool, CA (US); Paul A. Johnson, Folsom, CA (US)

(72) Inventors: Linda L. Hurd, Cool, CA (US); Paul A. Johnson, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 14/134,934

(22) Filed: Dec. 19, 2013

(65) Prior Publication Data

US 2015/0178987 A1 Jun. 25, 2015

(51) Int. Cl.
*G06T 15/00* (2011.01)
*G06F 1/32* (2006.01)
*G06T 15/10* (2011.01)
*G06T 17/10* (2006.01)

(52) U.S. Cl.
CPC .............. *G06F 1/324* (2013.01); *G06F 1/3203* (2013.01); *G06T 15/10* (2013.01); *G06T 17/10* (2013.01); *Y02B 60/1217* (2013.01)

(58) Field of Classification Search
CPC ................................ G06T 15/10; G06T 17/10
USPC ................... 345/420, 473, 502, 552
See application file for complete search history.

(56) References Cited

U.S. PATENT DOCUMENTS

| | | | | |
|---|---|---|---|---|
| 6,549,206 B1* | 4/2003 | Signes | | 345/473 |
| 6,882,345 B2* | 4/2005 | Movshovich et al. | | 345/502 |
| 8,553,040 B2* | 10/2013 | Sevigny et al. | | 345/502 |
| 8,665,266 B2* | 3/2014 | Vandrovec | | 345/420 |
| 8,717,368 B1* | 5/2014 | Kopylov et al. | | 345/473 |
| 8,797,336 B2* | 8/2014 | Hervas et al. | | 345/522 |
| 8,810,590 B2* | 8/2014 | Oat et al. | | 345/552 |

OTHER PUBLICATIONS

Jang et al, SSLShader: Cheap SSL Acceleration with Commodity Processors, NSDI, 2011, pp. 1-24.*

Ragan-Kelley, J., Lehtinen, J., Chen, J., Doggett, M., and Durand, F. 2011. Decoupled Sampling for Graphics Pipelines. ACM Transactions on Graphics, 30, 3, 17:1-17:17.*

(Continued)

*Primary Examiner* — Phu K Nguyen
(74) *Attorney, Agent, or Firm* — Garrett IP, LLC

(57) ABSTRACT

Technologies are presented that optimize graphics processing performance. A method of frequency scaling may include beginning a graphics workload with a starting geometry preprocessing frequency of a multiple of a streaming shader engine frequency where the multiple is non-zero; determining a primitive start pitch for a primitive of the graphics workload; comparing the determined primitive start pitch to a predetermined threshold and, if it exceeds the predetermined threshold: reducing the geometry preprocessing frequency, and, at the start of the next primitive, setting the geometry preprocessing frequency back to the starting geometry preprocessing frequency; and repeating the determining and comparing for each remaining primitive until an end of the graphics workload. Performance gain based on primitive start pitch information may also be determined.

21 Claims, 15 Drawing Sheets

(56) References Cited

OTHER PUBLICATIONS

Burns, C. A., Fatahalian, K., and Mark, W. R. 2010. A Lazy Object-Space Shading Architecture with Decoupled Sampling. In High Performance Graphics, 19-28.*

Petrik Clarberg, Robert Toth, Jon Hasselgren, Jim Nilsson, Tomas Akenine-Möller, AMFS: adaptive multi-frequency shading for future graphics processors, ACM Transactions on Graphics (TOG), v.33 n. 4, Jul. 2014.*

Petrik Clarberg, Robert Toth, Jacob Munkberg, A sort-based deferred shading architecture for decoupled sampling, ACM Transactions on Graphics (TOG), v.32 n.4, Jul. 2013.*

Owens, J. D.,Khailany, B.,Towles, B., Anddally,W. J. 2002. Comparing Reyes and OpenGL on a stream architecture. In Proceedings of the Graphics Hardware Conference. 47-56.*

Patney, A. and Owens, J. D. 2008. Real-time Reyes-style adaptive surface subdivision. ACM Trans. Graph. 27, 5, 143:1-143:8.*

* cited by examiner

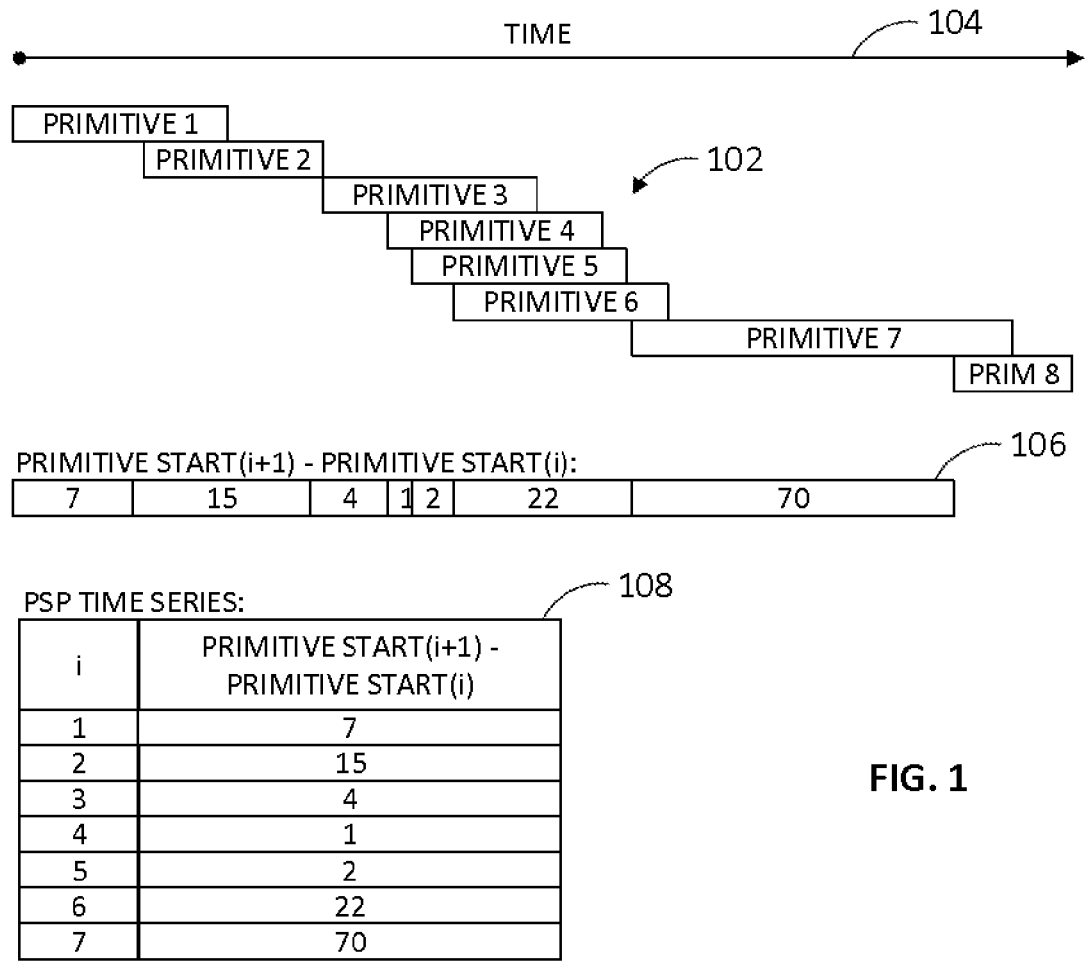
FIG. 1
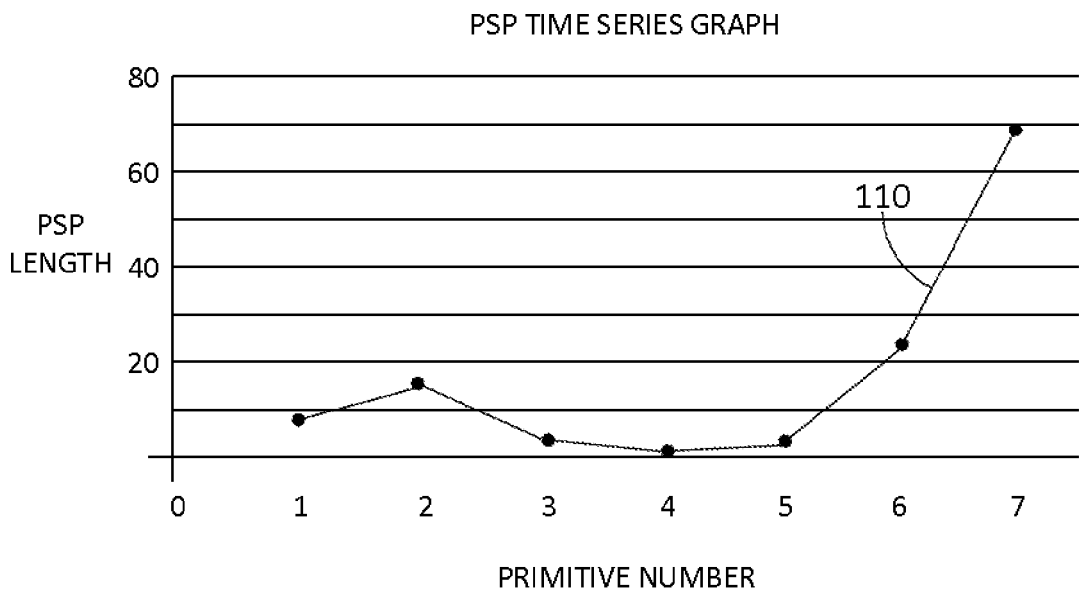

| FRAME STATS | WORKLOADS | | | | | |
|---|---|---|---|---|---|---|
| | 1 | 2 | 3 | 4 | 5 | 6 |
| BASELINE FRAME LENGTH (650MHz) IN RENDER CLOCKS | 22,224,347 | 10,221,752 | 88,149,129 | 15,447,918 | 33,740,036 | 15,017,961 |
| FRAME LENGTH COMPRESSION (FLC) 1300 | 1.8% | 3.8% | 0.6% | 5.0% | 12.8% | 3.1% |
| FLC 825 | 0.8% | 1.7% | 0.3% | 3.1% | 7.5% | 1.3% |
| RATIO OF FLC 1300 : FLC 825 | 2.25 | 2.25 | 1.94 | 1.61 | 1.7 | 2.3 |
| # OF VERTICES | 7,356,303 | 1,158,098 | 2,173,259 | 1,305,943 | 15,922,250 | 625,708 |
| # OF PRIMITIVES | 2168 | 921 | 421 | 448 | 4374 | 950 |
| MAX LENGTH (IN # BINS) (1 BIN=10K CLKS) | 461 | 61 | 2468 | 346 | 24 | 188 |
| AVE LENGTH (IN # BINS) | 1.02 | 1.11 | 20.93 | 3.42 | 0.72 | 1.58 |
| STD DEV (IN # BINS) | 10.92 | 4.54 | 145.03 | 21.64 | 1.75 | 10.45 |

DYNAMIC GRAPHICS GEOMETRY PREPROCESSING FREQUENCY SCALING AND PREDICTION OF PERFORMANCE GAIN

TECHNICAL FIELD

The technologies described herein generally relate to primitive-based threshold metrics for graphics performance improvement.

BACKGROUND

In graphics processing, one challenge is optimizing performance versus power usage, particularly with the execution of geometry preprocessing and streaming shader engine functions. In current graphics processing, the ratio of geometry preprocessing frequency to streaming shader engine frequency (herein referred to as the GPF/SSEF ratio) is statically set. In examples, this ratio may be statically set to a 1:1 ratio, a 1.5:1 ratio, a 2:1 ratio, or any ratio. Having this ratio statically set diminishes opportunity for performance optimization.

BRIEF DESCRIPTION OF THE DRAWINGS/FIGURES

FIG. 1 depicts example information defining primitive start pitch (PSP) of a graphics workload and an example PSP time series, according to an embodiment.

Figure 2:
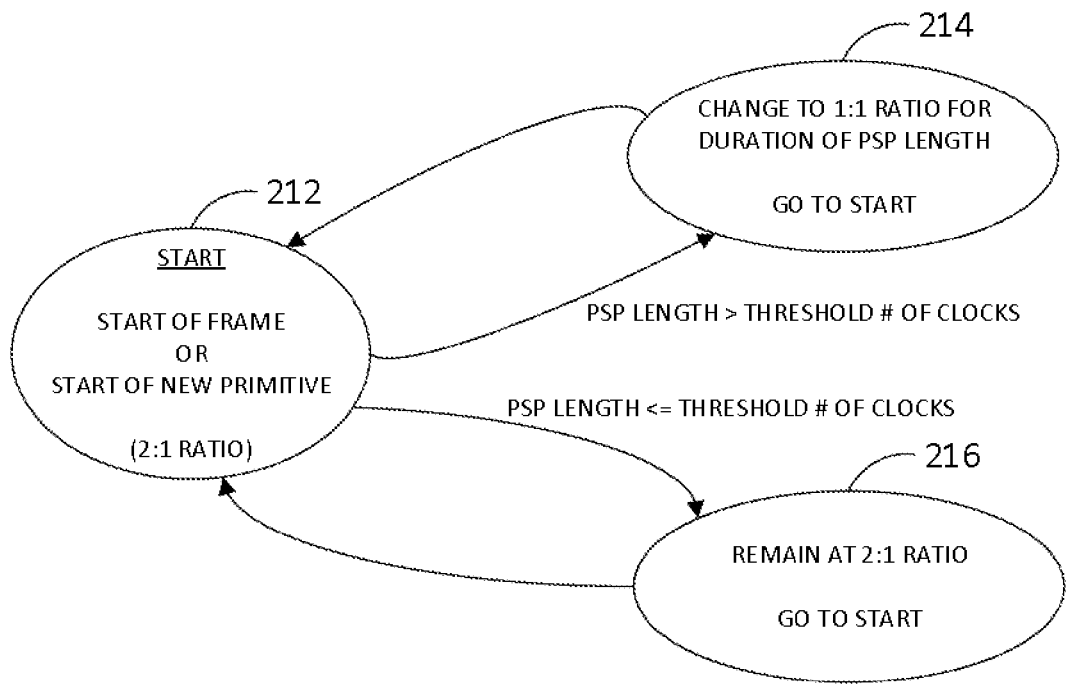
FIG. 2 is a state diagram depicting a frequency scaling method, according to an embodiment.

In the drawings, the leftmost digit(s) of a reference number may identify the drawing in which the reference number first appears.

DETAILED DESCRIPTION

In graphics processing, geometry preprocessing involves transforming input geometry (e.g., triangles) to prepare geometric models for processing. Streaming shader engines are streaming multiprocessors that convert the geometric models to pixels and apply shading. The ratio of geometry preprocessing frequency to streaming shader engine frequency (GPF/SSEF ratio) is typically statically set. If geometry preprocessing frequency is decoupled from streaming shader engine frequency, there may be opportunity to optimize this ratio to maximize graphics performance for given workload characteristics and available graphics power budget. In order to accomplish this, it may be desirable to determine a set of metrics or indicators that may be utilized to predict, for example: 1) when to dynamically change (e.g., intra-frame) the GPF/SSEF ratio; 2) the amount of frame length compression (e.g., in either geometry preprocessing clocks or streaming shader engine clocks) which may result relative to a 1:1 GPF/SSEF ratio, for example; and 3) given the available graphics power budget, whether an increase in the GPF/SSEF ratio will result in higher frames per second (FPS) given the streaming shader engine voltage frequency (VF) pair at which graphics is operating.

One way to accomplish this is by using a stochastic time series, based upon the number of clocks between the start of one primitive (e.g., a three-dimensional (3D) primitive) to the start of the next primitive, from the perspective of the command streamer unit (CS unit) at the start of a graphics pipeline. In this document, the number of clocks between the start of one primitive to the start of the next primitive is referred to as a primitive start pitch (PSP), and the stochastic time series is referred to as a PSP time series.

An equation describing the PSP time series may be:

$$PSP = \text{Primitive\_Start}(i+1) - \text{Primitive\_Start}(i) \quad \text{Eqn. 1}$$

where i represents a primitive.

FIG. 1 depicts example information defining primitive start pitch (PSP) of a graphics workload and an example PSP time series, according to an embodiment. In FIG. 1, graphics workload 102 is broken down into a number of primitives. In the example of FIG. 1, eight primitives are represented, with their starting and ending points relative to each other shown over time 104. The PSP for each primitive is shown in timeline example 106 as well as in table 108, where the shown values represent clock cycle values (in 10K clocks, as an example), and with the data as a whole comprising an example PSP time series. The example PSP time series is shown graphically in plot 110.

The statistical properties of a PSP time series may demonstrate correlation which may be leveraged to predict metrics such as, for example: 1) when to dynamically change GPF/SSEF ratio; and 2) the amount of frame length compression resulting from the change in the GPF/SSEF ratio with respect to a 1:1 GPF/SSEF ratio, for example. With respect to the second metric, the shorter a PSP, the higher the probability that there may be opportunity for bin gain (i.e., frame length compression) with respect to increasing geometry preprocessing frequency. In addition, the shorter a PSP, the lower the probability that input/output (I/O) limitation is occurring or that a maximum number of threads are loaded in execution units (EUs), etc. Furthermore, there may be a threshold (or set of thresholds) of PSP above which the probabilities of opportunity for bin gain become lower and lower. Methods of graphics processing may benefit from this with improvement in graphics performance in that the geometry preprocessing frequency may be increased in sections of a graphics frame with a higher probability of bin gain opportunity. In sections of a frame where probability of bin gain is lower, the geometry frequency may be reduced (to, for example, a 1:1 GPF/SSEF ratio), which may also serve to reduce power requirements in geometry preprocessing compared to when using a static scaling approach.

PSP information may be used to determine the first metric, stated above, of when to dynamically change the GPF/SSEF ratio. A method for determining when to change the GPF/SSEF ratio may include starting a graphics workload with an initial geometry preprocessing frequency that is higher than the streaming shader engine frequency In examples provided herein, the geometry preprocessing frequency may be set to 1.5 times the streaming shader engine frequency or twice the streaming shader engine frequency, for example. However, any multiple of the streaming shader engine frequency may be used. The scaling factors chosen may span a range, though selection of a scaling factor may depend upon, for example, step size limitations.

A counter (e.g., of clock cycles) may be used to determine each PSP. For example, streaming shader engine clocks may be used. However, other clocks may also be used. If a PSP exceeds a predetermined threshold (e.g., 500K clocks or another predetermined threshold, which may be on the order of thousands of clocks to hundreds of thousands of clocks to millions of clocks or more, depending on workload), the geometry preprocessing frequency may be reduced until the start of a next primitive. In an example, the geometry preprocessing frequency may be reduced to equal the streaming shader engine frequency until the start of the next primitive. At the start of the next primitive, the geometry preprocessing frequency may be set again to its higher initial frequency (e.g., back to a multiple of the streaming shader engine frequency), and the counter may be reset to zero. Processing of each primitive may continue in this way until the end of the graphics workload. If a PSP does not exceed the predetermined threshold, the geometry preprocessing frequency may remain at the initial higher setting. A graphics workload with primitives all having PSPs at or below the predetermined threshold may run entirely with the geometry preprocessing frequency at the higher setting.

The predetermined PSP threshold may be stored in, for example, a hardware register, a software driver, a lookup table, etc., that are accessible by the graphics processor. In an embodiment, the predetermined PSP threshold may be factory set. In an embodiment, the predetermined PSP threshold may be programmable.

FIG. 2 is a state diagram depicting an example of a frequency scaling method such as the one described above, according to an embodiment. At 212, which represents the start of a frame or the start of a primitive, the GPF/SSEF ratio may be set at 2:1. (In this example, the geometry preprocessing frequency is shown to be set to an initial frequency that is twice that of the streaming shader engine frequency (a 2:1 ratio). However, any ratio may be used where the geometry preprocessing frequency is higher than the streaming shader engine frequency.) If during processing of a primitive, the PSP for that primitive exceeds a threshold number of clocks, the method continues at 214, where the GPF/SSEF ratio may be changed to 1:1 until the start of the next primitive. (In this example, the geometry preprocessing frequency is reduced to equal the streaming shader engine frequency (a 1:1 ratio). However, any ratio may be used where the geometry preprocessing frequency is lower than its initial frequency.) At the start of the next primitive, the method returns to 212, where the GPF/SSEF ratio may be changed back to its initial ratio. If the PSP for that primitive does not exceed the threshold number of clocks, the method continues at 216, where the GPF/SSEF ratio remains at the initial ratio, and the method returns to 212 to continue in this manner. It should be noted that the methods for determining when to change the GPF/SSEF ratio described herein may not need knowledge of frame boundaries.

Figure 3:
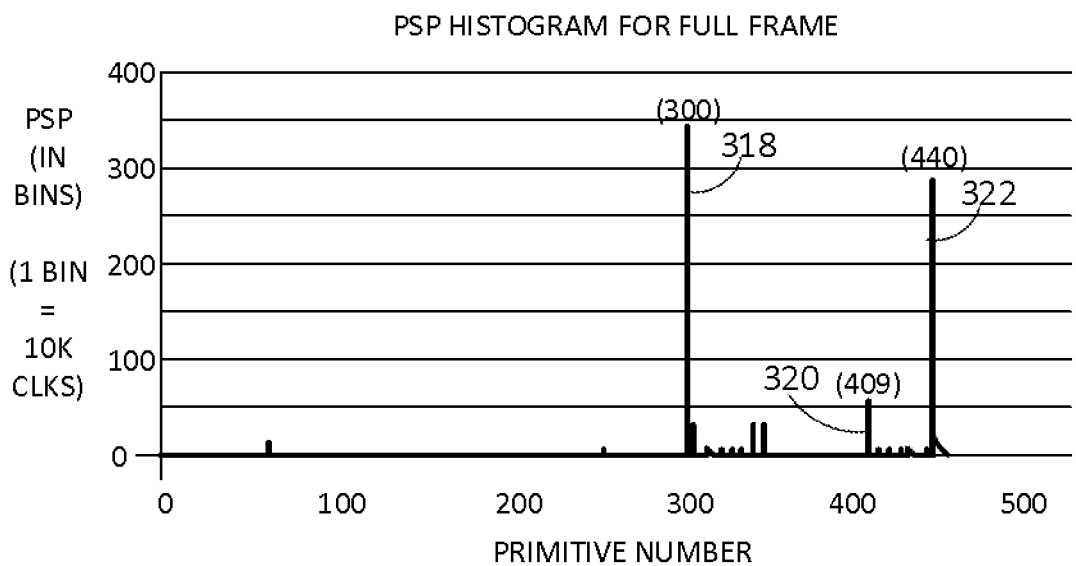
FIG. 3 is an example PSP histogram for a graphics frame, according to an embodiment.

FIG. 3 shows an example PSP histogram for a graphics frame, according to an embodiment. If the predetermined PSP threshold is set at, for example, 500K clocks, in FIG. 3, three primitives have a PSP that exceeded the predetermined threshold: primitives 300, 409, and 440, as shown by plots 318, 320, and 322, respectively. During processing of each of these primitives, the geometry preprocessing frequency may be reduced to a lower frequency from the time the threshold is exceeded until the start of the next primitive.

Figure 4:
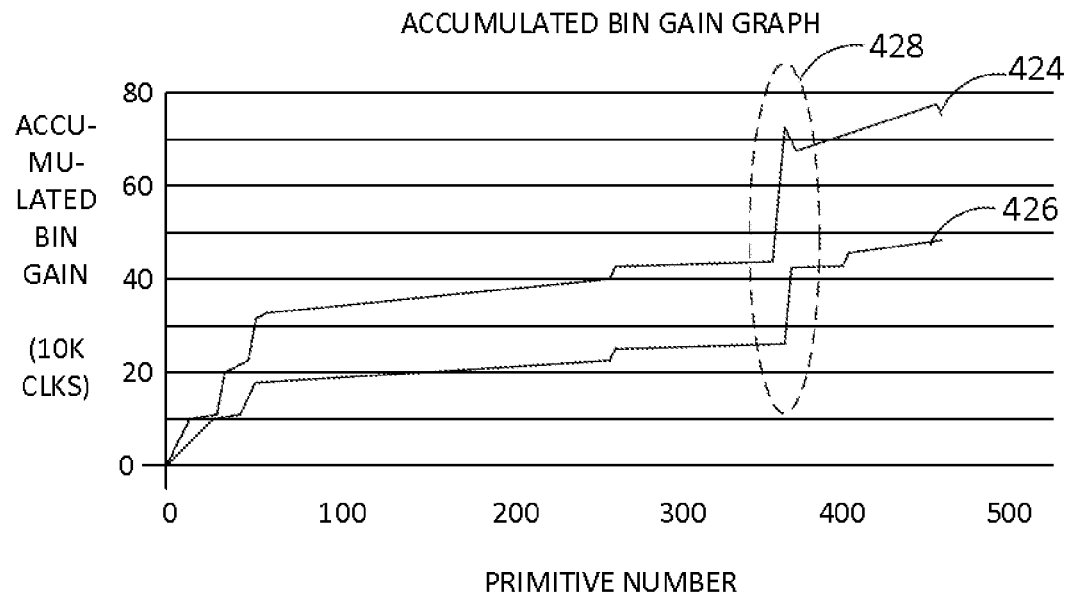
FIG. 4 is an example graph of accumulated bin gain for a graphics frame at two different frequency ratios, according to an embodiment.

FIG. 4 is an example graph of accumulated bin gain (i.e., performance increase) for a graphics frame at two different GPF/SSEF ratios relative to a 1:1 GPF/SSEF ratio, according to an embodiment. Plot 424 represents accumulated bin gain at a GPF/SSEF ratio of 2:1, and plot 426 represents accumulated bin gain at a GPF/SSEF ratio of 1.5:1. According to plots 424 and 426, there is significantly better performance at the 2:1 ratio than at the 1.5:1 ratio relative to at the 1:1 ratio. Indicator 428 indicates a significant accumulated bin gain jump around primitive number 375. It is to be noted that, in this example, the accumulated bin gain throughout the frame is non-uniform.

Figure 5:
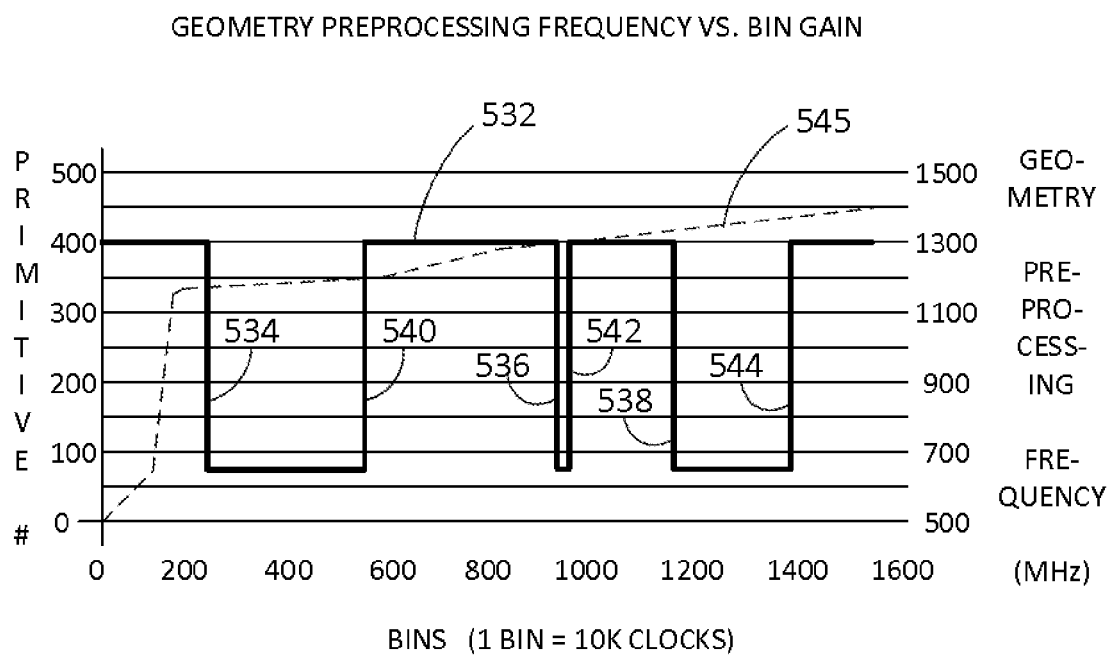
FIG. 5 is an example graph of geometry preprocessing frequency versus bin for a graphics frame, according to an embodiment.

FIG. 5 is an example graph of geometry preprocessing frequency versus bin gain for a graphics frame, according to an embodiment. In FIG. 5, geometry preprocessing frequency versus bin gain is shown by plot 532. Indicators 534, 536, and 538 indicate, during this example graphics frame, when geometry preprocessing frequency is lowered, and indicators 540, 542, and 544 indicate when geometry preprocessing frequency is raised. In FIG. 5, primitive number versus bin gain is also shown on the same graph as plot 545, and shows that when processing for a primitive goes on for an extended period of time, the geometry preprocessing frequency is lowered. Primitive number versus bin gain in FIG. 5 also shows the non-uniformity of performance gain due to the changing GPF/SSEF ratio.

Figure 6:
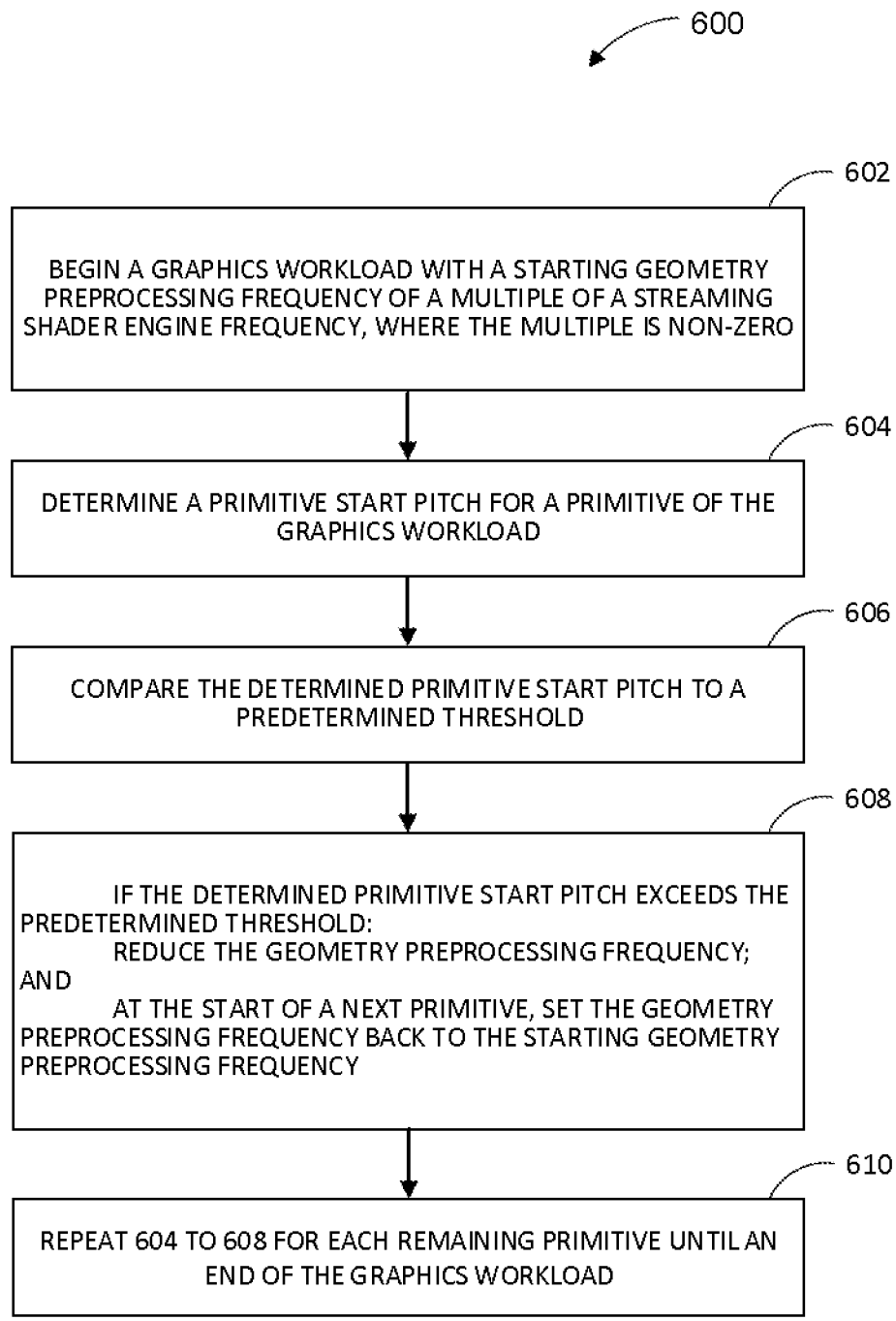
FIG. 6 is an example flow chart depicting a method of frequency scaling in a graphics system, according to an embodiment.

FIG. 6 is an example flow chart depicting a method 600 of frequency scaling in a graphics system, according to an embodiment. The method shown in FIG. 6 is similar and may summarize the example method of frequency scaling described above. At 602, a graphics workload may be started with a starting geometry preprocessing frequency of a multiple of a streaming shader engine frequency, where the multiple is non-zero. At 604, a PSP for a primitive of the graphics workload may be determined. At 606, the determined PSP may be compared to a predetermined threshold. At 608, if the determined PSP exceeds the predetermined threshold, the geometry preprocessing frequency may be reduced and, at the start of a next primitive, the geometry preprocessing frequency may be set back to the starting preprocessing frequency. If the determined PSP does not exceed the predetermined threshold, the geometry preprocessing frequency remains at the starting preprocessing frequency. At 610, the actions of 604 to 608 may be repeated for each of the remaining primitives until the end of the graphics workload is reached. In an embodiment, the determined PSP may also be used to determine opportunity to power-gate execution units and/or a portion of streaming shader engine(s) to further improve graphics power-performance efficiency, as is discussed below.

As stated earlier, the amount of frame length compression for a particular graphics frame resulting from a change in the GPF/SSEF ratio with respect to a reference GPF/SSEF ratio (e.g., a 1:1 ratio) may also be determined using the PSP information. For this frame length compression determination, knowledge of frame boundaries is needed in addition to PSP information, and a set of thresholds are used. A counter may determine each PSP (e.g., by counting clocks of each PSP), and accumulators may be used to sum the number of PSPs that fall into at least two "buckets," where the buckets are assigned clock thresholds. As an example, a first bucket ("Bucket 1") may include the sum of PSPs of a graphics frame that are less than, for example 200K clock cycles in duration. A second bucket ("Bucket 2") may include the sum of PSPs of the graphics frame that are between 200K clock cycles and 300K clock cycles. At the end of the frame, the following metric may be determined:

$$\text{Metric} = \text{Bucket 1}/\text{Bucket 2} \qquad \text{Eqn. 2}$$

This metric represents the ratio of populations of two different sections of a PSP probability density function for a graphics frame. The lower end of a PSP histogram may be viewed as a high frequency content of the time series. The metric may be used to estimate the amount of frame length compression for, for example, a 2:1 GPF/SSEF ratio versus a 1:1 GPF/SSEF ratio. For this estimate, the following may be used:

$$\text{Frame Length Compression} = (\text{Metric} - b)/m \qquad \text{Eqn. 3}$$

where b is an intercept and m is a slope, each determined using a line model.

If the estimated frame length compression is determined to be below a predetermined frame length compression threshold, the frequency scaling feature discussed above may be disabled. For example, the geometry preprocessing frequency may be set to remain at the reduced frequency for a number of frames or until the start of a next scene.

Figures 7, 8:
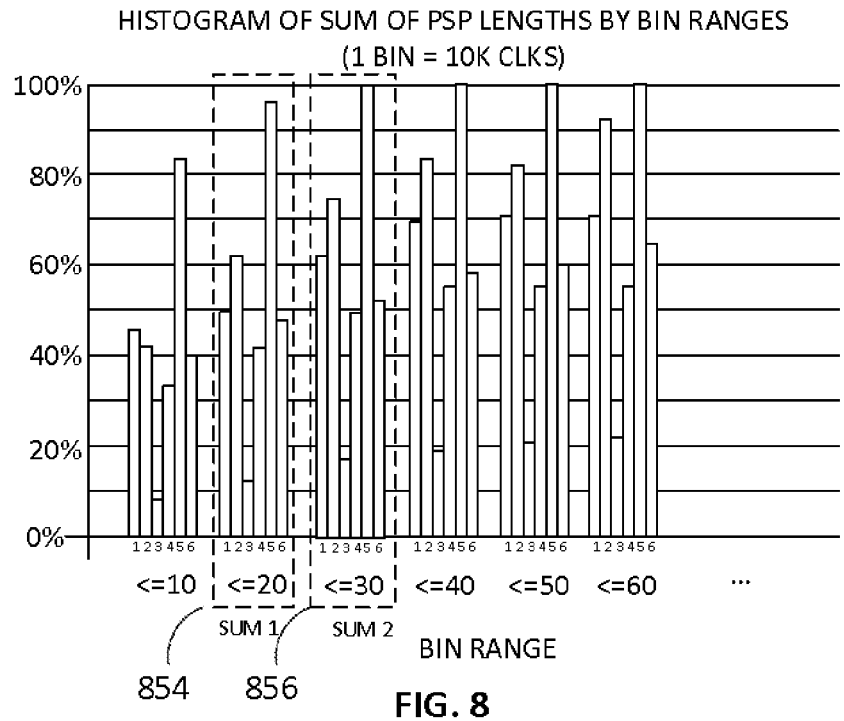
FIG. 7 is a chart of example workload statistics for various graphics workloads, according to an embodiment.
FIG. 8 is an example histogram of the sum of PSP lengths by bin ranges, according to an embodiment.
Figure 9:
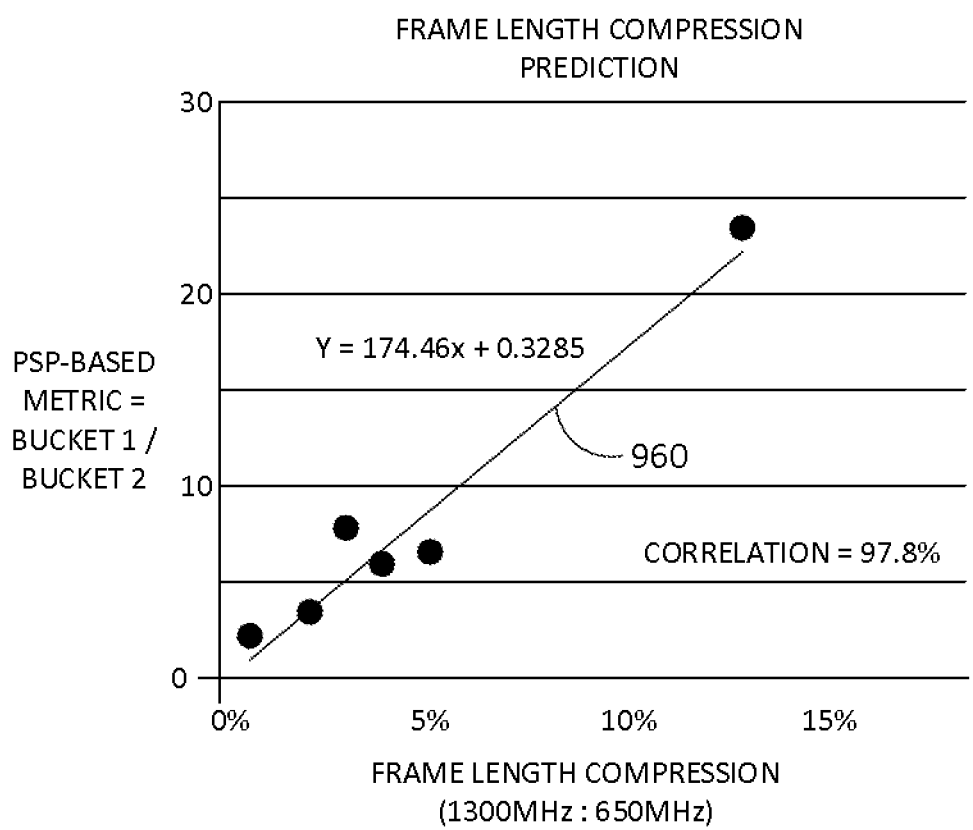
FIG. 9 is an example line model showing frame length compression prediction, according to an embodiment.

FIGS. 7, 8, and 9 represent an example of frame length compression estimation. FIG. 7 is a chart 750 of example workload statistics for various graphics workloads, according to an embodiment. Each of the six workloads represents a graphics frame. FIG. 8 is an example histogram of the sum of PSP lengths by bin ranges, according to an embodiment. As can be seen in the chart, different workloads may scale differently using the frequency scaling technology described herein, and the data may be used to determine when the most opportunity for performance gain arises.

In FIG. 8, PSP sums of each of the six workloads are shown in 100K clock segments. In FIG. 8, these are shown cumulatively, by percentage. Continuing the example given above, "Bucket 1" may be defined as PSPs of 200K clock cycles or less (shown as Sum 1 (854) in FIG. 8), and "Bucket 2" may be defined as PSPs of between 200K and 300K clock cycles (which may equal Sum 2 (856) minus Sum 1 (854) due to the cumulative nature of FIG. 8).

As shown in FIG. 9, multiple workloads may be run to collect data (e.g., using a 2:1 GPF/SSEF ratio), and metrics vs. frame length compression may be plotted. From the plotted data, a line model 960 may be determined, and through correlation, values for slope m and intercept b may be determined. In this example, slope m was determined to be 174.46, and intercept b was determined to be 0.3285. These values may be used in Eqn. 3 above to estimate frame length compression. However, as would be understood by one of ordinary skill in the art, a line model may have differing results depending on various factors, such as, for example, products used, frequency ratios used, memory speeds, use of power-gating, etc.

There are various other factors that may be taken into account when dynamically changing the GPF/SSEF ratio to improve graphics performance. For example, other conditions may be assessed to determine if the geometry preprocessing frequency needs to be reduced. These other conditions may include, for example, maximum execution unit threads loaded, requests to last level caches (LLC), LLC misses, and/or indications of read/write traffic between the graphics processor and the LLC. For example, for a given primitive, when comparing the determined PSP to a predetermined threshold, it may also be determined whether an I/O limit was reached. If the I/O limit is reached or the determined PSP exceeds the predetermined threshold, the geometry preprocessing frequency may be reduced. In a related example, for a given primitive, when comparing the determined PSP to a predetermined threshold, it may also be determined whether an I/O limit was reached and whether a maximum number of execution unit threads are loaded. If the determined PSP exceeds the predetermined threshold, the geometry preprocessing frequency may be reduced only if the I/O limit is reached or if the maximum number of execution unit threads are loaded.

Other examples that take into account other factors may also be contemplated. For example, utilization events (e.g., EU floating point unit (FPU) pipe utilization, sampler utilization, internal cache utilization, etc.) and/or temperature information may also be assessed to optimize power consumption. Using a higher geometry preprocessing frequency may require a higher voltage, and leakage may increase. Taking into account these other factors may allow power management control to determine if increasing the geometry preprocessing frequency uses more power than an allotted buffer. If it is determined that increasing the geometry preprocessing frequency results in a net performance loss, it may not be beneficial to take advantage of the frequency scaling feature until conditions change to justify its use.

Figure 10:
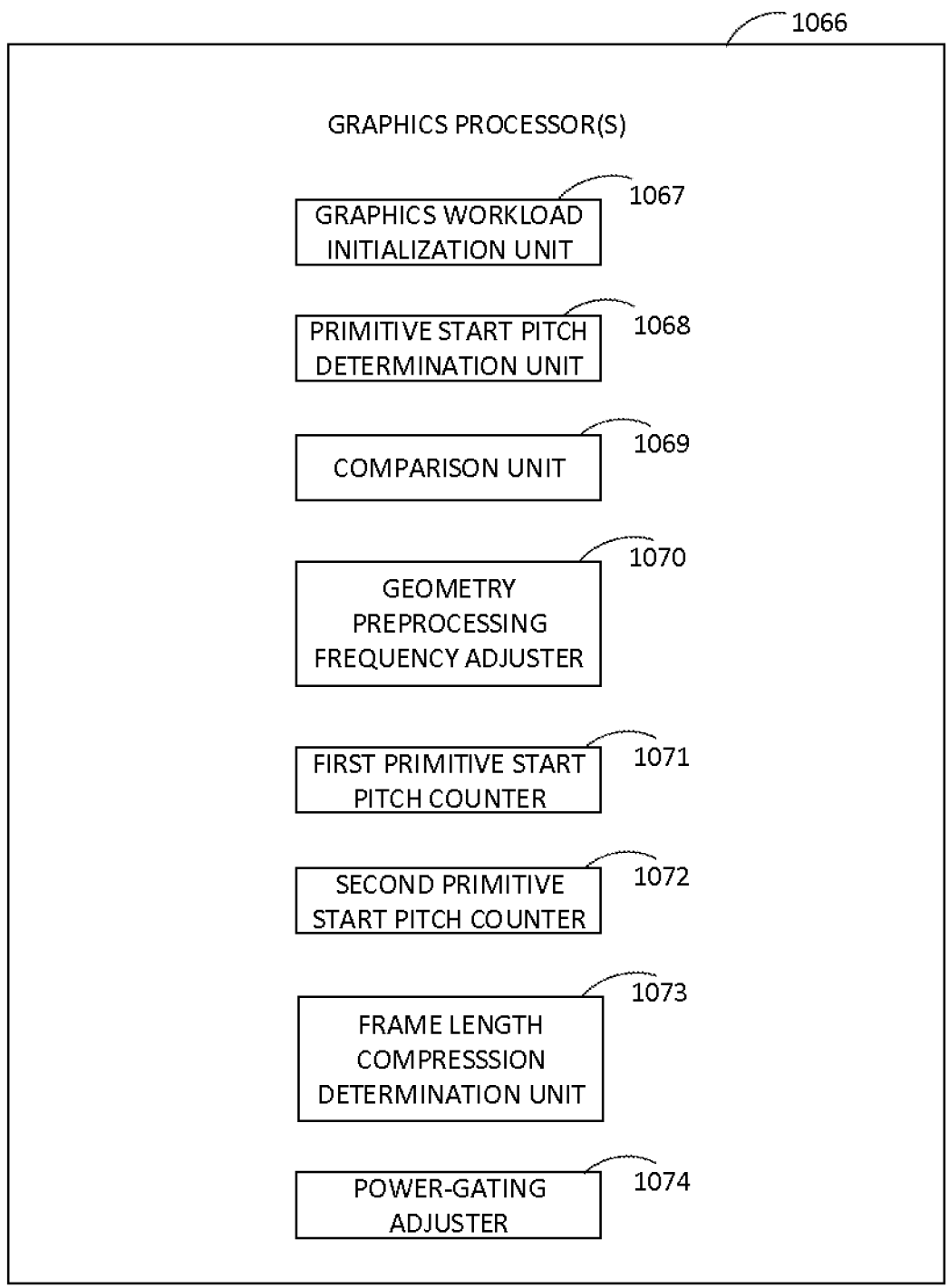
FIG. 10 is a block diagram of functional components of an example graphics processor, according to an embodiment.

FIG. 10 is a block diagram of functional components of an example graphics processor 1066, according to an embodiment. In embodiments, each of the functional components of example graphics processor 1066 may be implemented in hardware, software, firmware, or a combination. An example graphics processor 1066 may include, for example, a graphics workload initialization unit 1067, a primitive start pitch determination unit 1068, a comparison unit 1069, and a geometry preprocessing frequency adjuster 1070, which may execute the functions described above with reference to FIG. 6, for example. Graphics workload initialization unit 1067 may set a starting geometry preprocessing frequency prior to starting a graphics workload. Primitive start pitch determination unit 1068 may determine primitive start pitches of the graphics workload. Comparison unit 1069 may compare the determined primitive start pitches to a determined threshold. Geometry preprocessing frequency adjuster 1070 may adjust the geometry preprocessing frequency based on the results provided by comparison unit 1069 and possibly other factors.

In an embodiment, graphics processor 1066 may further include, for example, one or more primitive start pitch counters (such as first primitive start pitch counter 1071 and second primitive start pitch counter 1072) and a frame length compression determination unit 1073. The primitive start pitch counters may, for example, count primitive start pitches for each "bucket" used in the frame length compression determination discussed above. In an embodiment, the primitive start pitch counters may include one or more accumulators, for example. Frame length compression determination unit 1073 may estimate frame length compression as discussed above. In an embodiment, graphics processor 1066 may further include a power-gating adjuster 1074 for power-gating resources, as will be discussed below.

A PSP time series may also be useful in determining when there may be opportunity in a graphics frame to control power usage of, or power-gate, execution units and/or a portion of streaming shader engine(s) in order to improve graphics power-performance efficiency. For example, at the start of a graphics frame, graphics is limited in geometry preprocessing and may not need all of the available streaming shader engine resources active. By power-gating one or more of the streaming shader engine resources, leakage may be reduced and power-performance efficiency may be increased.

An opportunity for power-gating streaming shader engine resources may occur between the start of a frame and the point at which a first "knee" occurs in the PSP time series. A "knee" may be defined as when a PSP length exceeds a predetermined threshold. In embodiments, the threshold may be factory set and/or programmable (e.g., settable in a hardware register, software driver, lookup table, etc.). The start of a frame may be detectable, for example by a driver. Each frame may begin with one or more streaming shader engine resources power-gated until a "knee" occurs.

Figure 11:
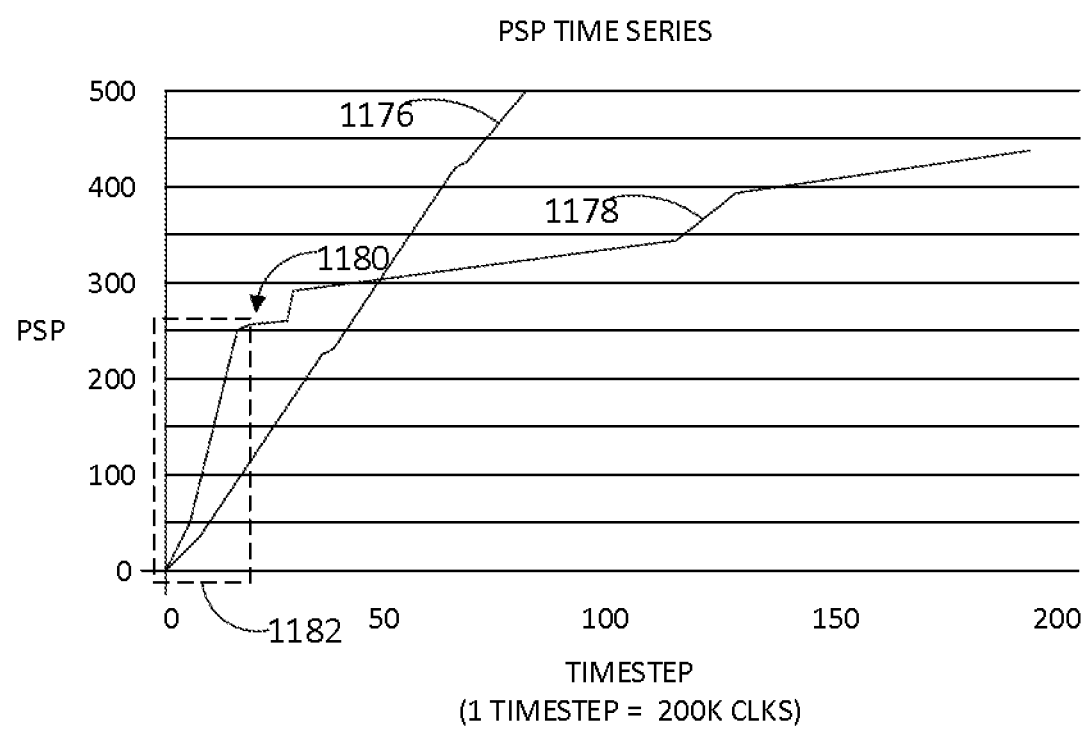
FIG. 11 depicts example PSP time series for two different workloads, according to embodiments.

FIG. 11 depicts an example PSP time series for two different workloads, according to embodiments. In PSP time series 1176, no "knee" occurs. In PSP time series 1178, a "knee" 1180 occurs. The portion 1182 of time series 1178 that occurs prior to "knee" 1180 may be considered the opportunity to power-gate. In this example, the opportunity to power-gate in the frame represented by time series 1178 occurs in about the first 10% of the frame. However, the percentage of the frame length that lies between the start of frame and the first "knee" may vary with workload, and within a workload there is variance across frames. For frames in which the "knee" occurs immediately, or almost immediately, the opportunity to power-gate is very small (e.g., ~0% of the frame). For frames in which no "knee" occurs, the opportunity to power-gate is 100% of the frame. For most workloads, the opportunity to power-gate lies somewhere in-between, as shown by PSP time series 1178 in FIG. 11. In an embodiment, if the opportunity to power-gate is determined to be less than a predetermined power-gating threshold, then the power-gating feature may be disabled (e.g., for a predetermined number of future frames). In embodiments, the predetermined power-gating threshold may be factory set and/or programmable (e.g., settable in a hardware register, software driver, lookup table, etc.).

Figure 12:
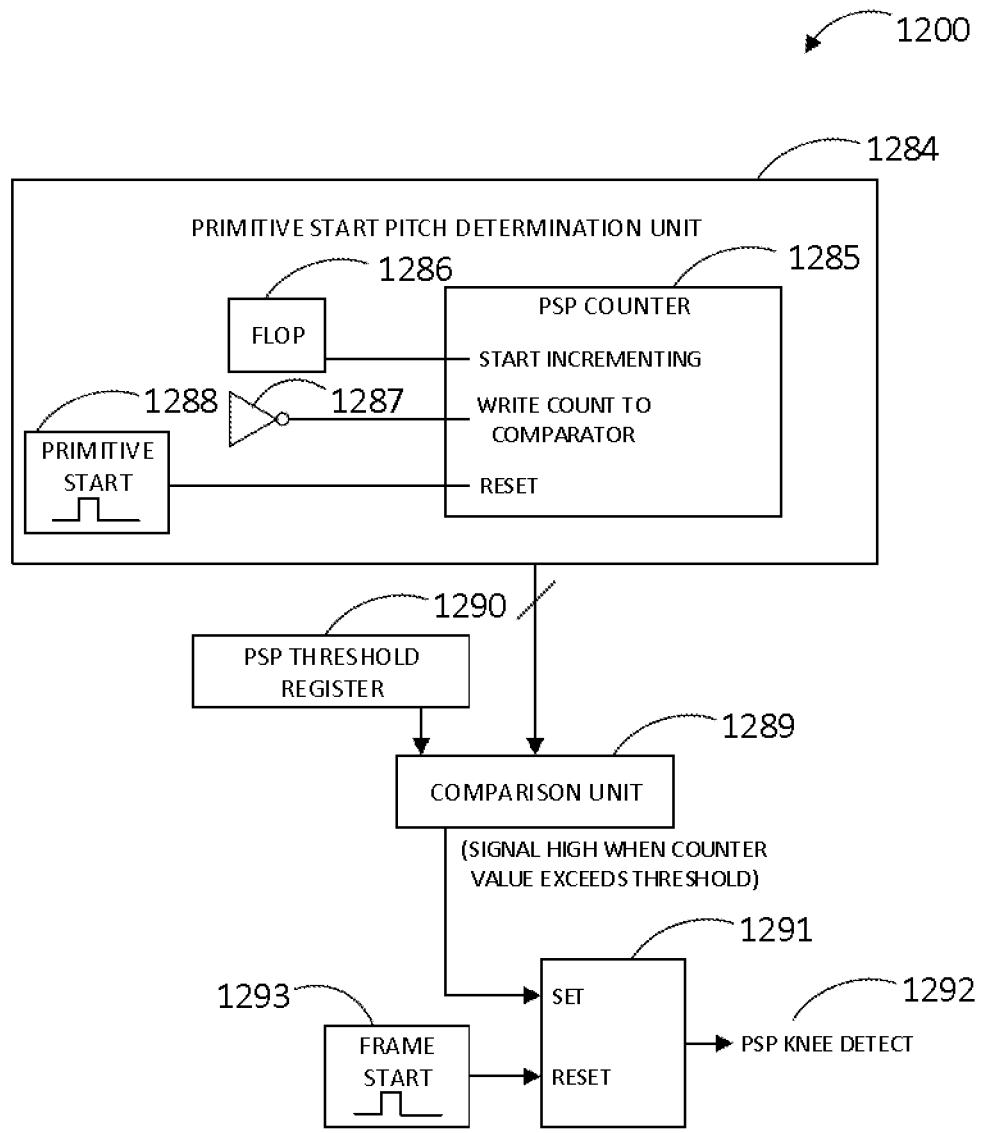
FIG. 12 is a block diagram of an example "knee" detection system, according to an embodiment.

FIG. 12 is a block diagram of an example "knee" detection system 1200, according to an embodiment. "Knee" detection system 1200 may include, for example, a primitive start pitch determination unit 1284 that may include a PSP counter 1285, a count start unit 1286, a write count unit 1287, and a primitive start signal provider 1288. Count start unit 1286 may signal PSP counter 1285 to start counting PSPs. Write count unit 1287 may output the count, and primitive start signal provider 1288 may notify PSP counter 1285 when to reset the count back to zero when at the start of a next primitive. "Knee" detection system 1200 may further include a comparison unit 1289 that may receive a PSP count from PSP determination unit 1284 and compare it to a predetermined PSP threshold for power-gating purposes set in, for example, a PSP threshold register 1290. If comparison unit 1289 determines that a PSP count exceeds the PSP threshold, it may send a signal to a "knee" detection output unit 1291, which may output a PSP "knee" detect signal 1292. A frame start signal provider 1293 may notify "knee" detection output unit 1291 when to reset PSP "knee" detect signal 1292 when at the start of a next frame.

Figure 13A:
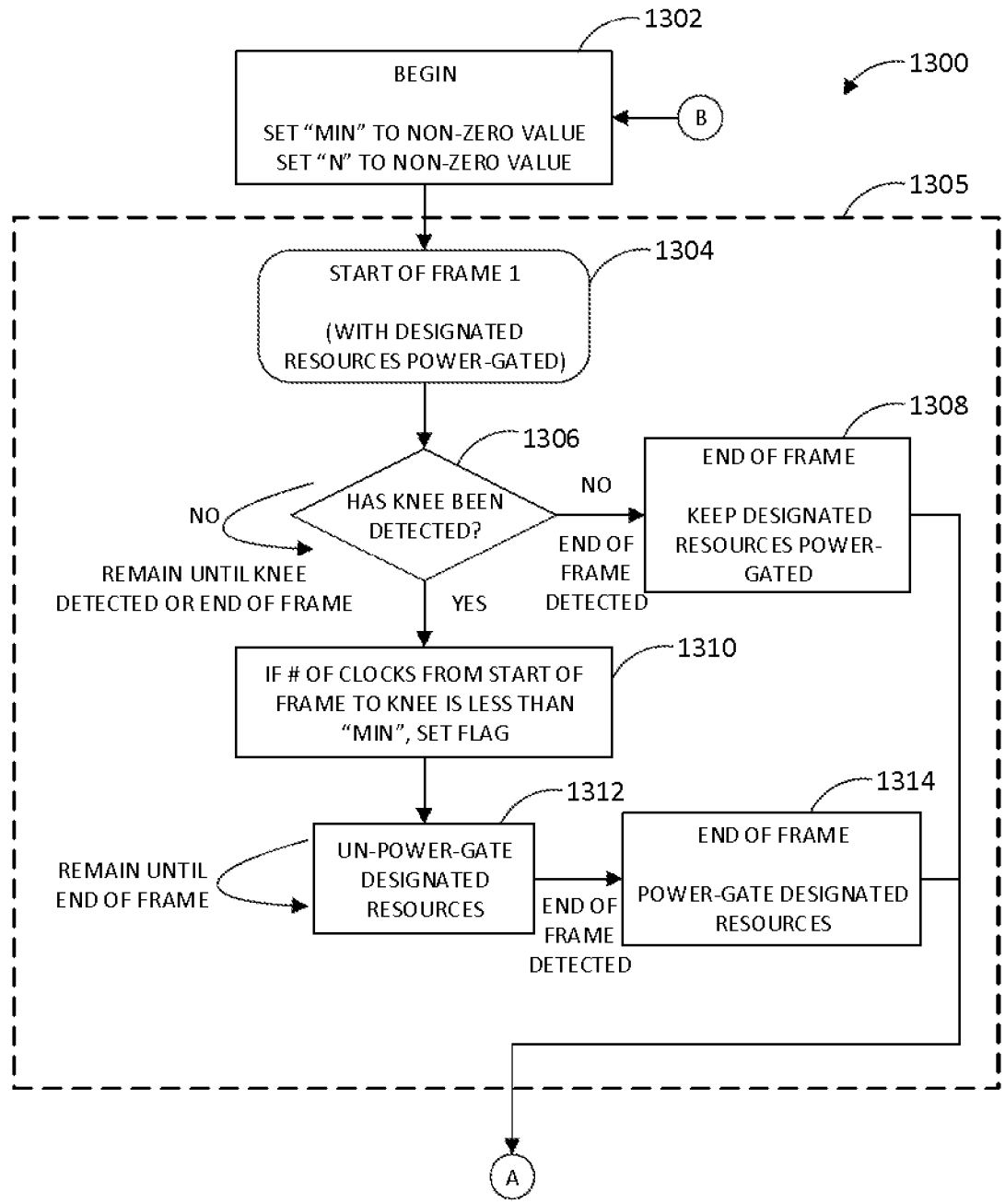
FIGS. 13A and 13B depict an example flow chart of a power-gating method, according to an embodiment.
Figure 13B:
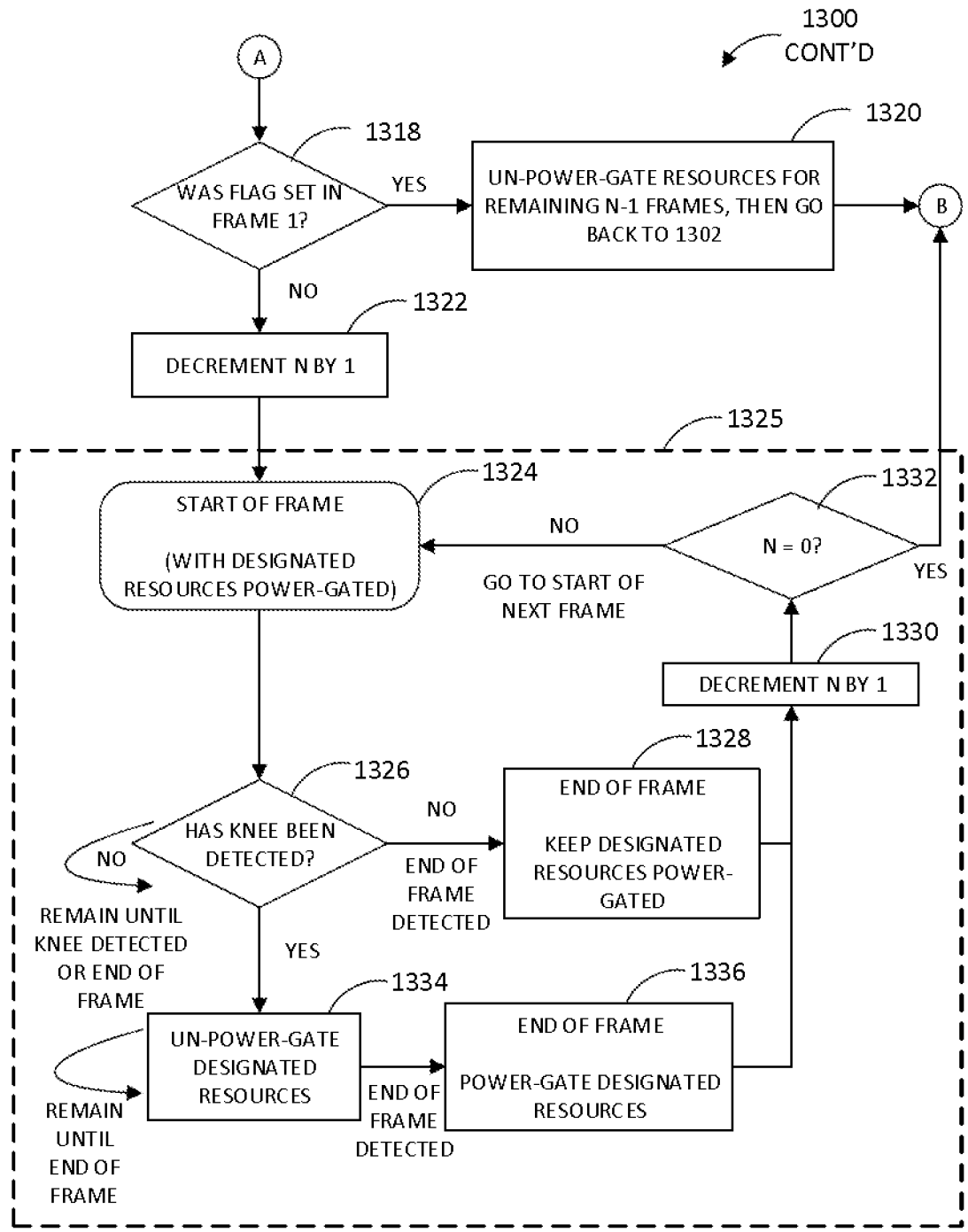

FIGS. 13A and 13B depict an example flow chart of a power-gating method 1300, according to an embodiment. At 1302, variables "MIN" and "N" may be set to non-zero values. "N" may represent a predetermined number of frames. The value chosen for "N" may depend on the workload. For example, if the workload has few scene changes, then "N" may be set higher, whereas if the workload has many (e.g., frequent) scene changes, then "N" may be set lower. Thus, "N" may be set to a value that makes sense for characteristics of a particular workload. "MIN" may represent a minimum PSP threshold at which the power-gating feature would be used at each frame of the N frames. The value chosen for "MIN" may take into account the overhead (e.g., time) that it may take for power management control to "wake up" power-gated blocks of logic.

At 1304, processing of the first frame of the N frames may begin, with one or more designated streaming shader engine resources power-gated. Processing of the first frame of the N frames is denoted by the box designated as 1305. At 1306, it is determined whether the "knee" has been detected as discussed above. If not, and the end of frame is not detected, processing may remain at 1306 until the "knee" or the end of frame is detected. If not, and the end of frame is detected, processing may continue at 1308, where the designated streaming shader engine resources may remain power-gated. Processing may then continue at 1318 in FIG. 13B.

Referring back to 1306, if the "knee" has been detected, processing may continue at 1310, where a flag may be set if the number of clocks from the start of the frame to the knee is less than "MIN". At 1312, one or more of the power-gated resources may be un-power-gated until the end of the frame. At the end of the frame, processing may continue at 1314, where one or more of the designated streaming shader engine resources may again be power-gated. Processing may then continue at 1318 in FIG. 13B.

At 1318, it may be determined whether the flag was set at 1310. If so, processing continues at 1320, where one or more of the power-gated resources may be un-power-gated for the remaining N−1 frames, and processing may continue at 1302 in FIG. 13A. If not, processing may continue at 1322, where N may be decremented by one. At 1324, processing of a next frame of the N frames may begin, with one or more designated streaming shader engine resources power-gated. Processing of frames other than a first frame of N frames is denoted by the box designated as 1325. At 1326, it is determined whether the "knee" has been detected as discussed above. If not, and the end of frame is not detected, processing may remain at 1326 until the "knee" or the end of frame is detected. If not, and the end of frame is detected, processing may continue at 1328, where the designated streaming shader engine resources may remain power-gated. Processing may then continue at 1330 where N is decremented by one. At 1332, it may be determined whether N has reached a value of zero. If not, processing may continue at 1324 as the start of a next frame. If so, processing may continue back at 1302 in FIG. 13A.

Referring back to 1326, if the "knee" has been detected, processing may continue at 1334, where one or more of the power-gated resources may be un-power-gated until the end of the frame. At the end of the frame, processing may continue at 1336, where one or more of the designated streaming shader engine resources may again be power-gated. Processing may then continue at 1330, where N is decremented by one. At 1332, it may be determined whether N has reached a value of zero. If not, processing may continue at 1324 as the start of a next frame. If so, processing may continue back at 1302 in FIG. 13A. Processing may continue in this way until the end of the graphics workload.

Figure 14:
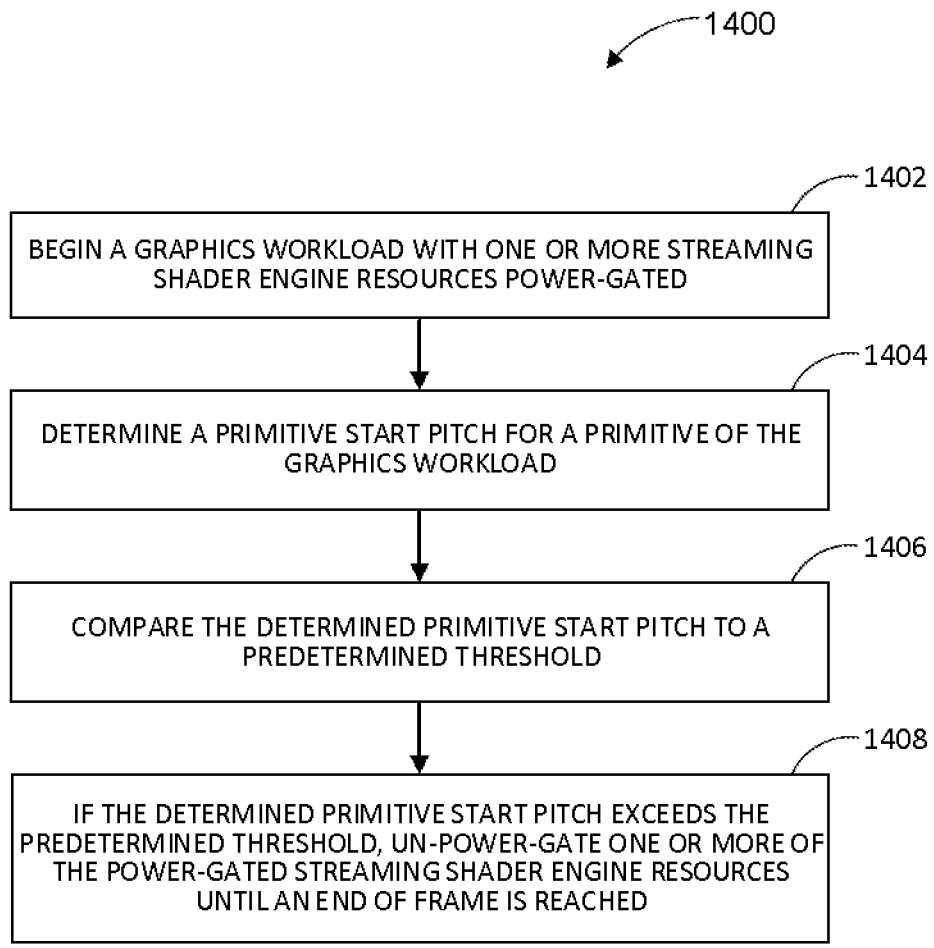
FIG. 14 is an example flow chart depicting a method of power-gating in a graphics system, according to an embodiment.

Another example to summarize a power-gating feature in graphics processing of a frame may be found in flow chart 1400 of FIG. 14, according to an embodiment. At 1402, a graphics workload may be started with one or more streaming shader engine resources power-gated. At 1404, a PSP for a primitive of the graphics workload may be determined. At 1406, the determined PSP may be compared to a predetermined power-gating threshold. At 1408, if the determined primitive start pitch exceeds the predetermined power-gating threshold, one or more of the power-gated streaming shader engine resources may be un-power-gated until the end of frame is reached. In an embodiment, the determined PSP may also be used to determine an opportunity to scale the geometry preprocessing frequency to further improve graphics power-performance efficiency, as discussed above.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Figure 15:
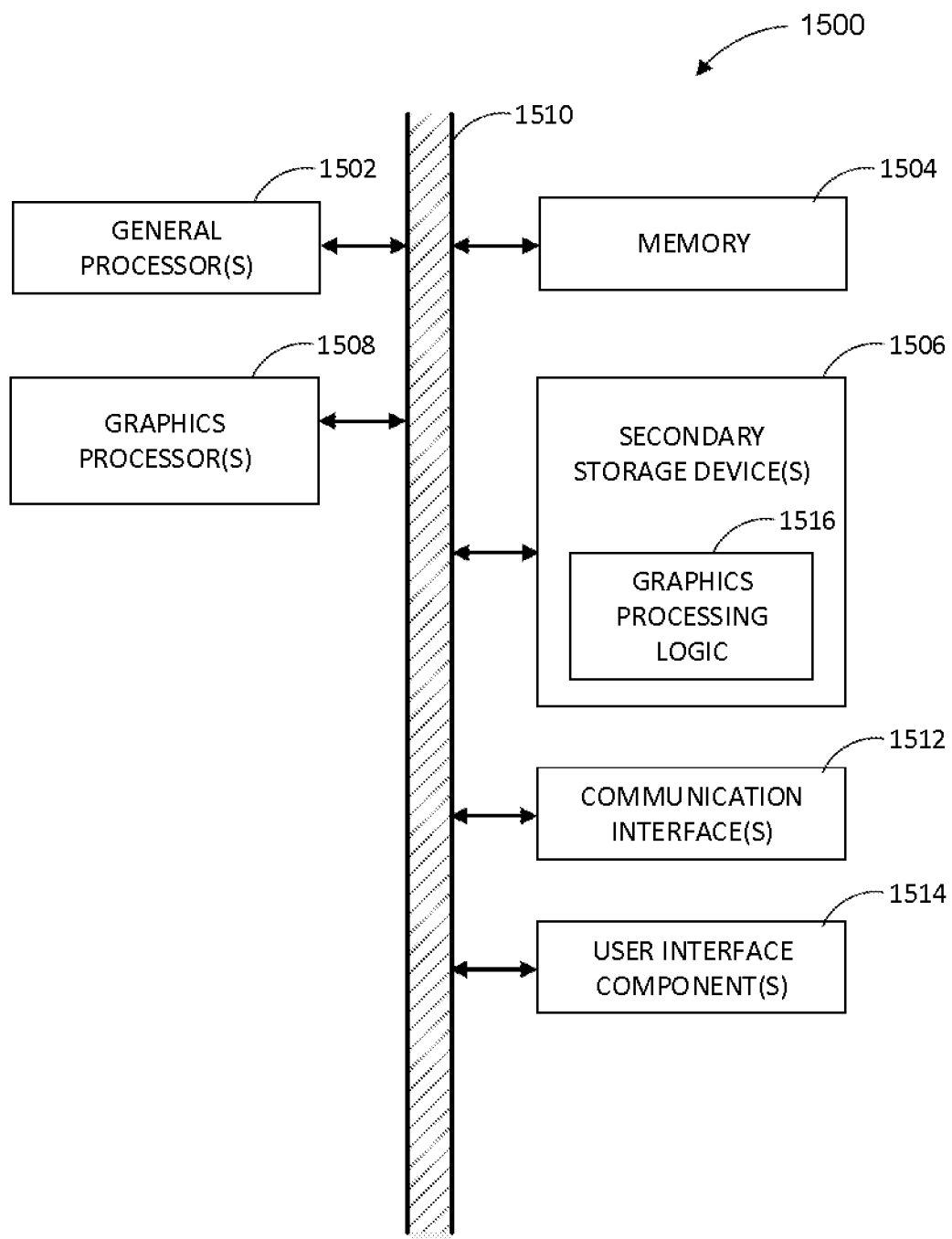
FIG. 15 is a block diagram of an example graphics processing device, according to an embodiment.

As stated above, in embodiments, some or all of the processing described herein may be implemented as hardware, software, and/or firmware. Such embodiments may be illustrated in the context of an example computing system 1500 as shown in FIG. 15. Computing system 1500 may include one or more central processing unit(s) (CPU), such as one or more general processors 1502, connected to memory 1504, one or more secondary storage devices 1506, and one or more graphics processors 1508 by a link 1510 or similar mechanism. Alternatively, graphics processor(s) 1508 may be integrated with general processor(s) 1502. Graphics processor(s) 1508 may include one or more logic units, such as those described with reference to FIG. 10, for example, for carrying out the methods described herein. In embodiments, other logic units may also be present. One skilled in the art would recognize that the functions of the logic units, such as logic units discussed with reference to FIG. 10 may be executed by a single logic unit, or any number of logic units. Computing system 1500 may optionally include communication interface(s) 1512 and/or user interface components 1514. The communication interface(s) 1512 may be implemented in hardware or a combination of hardware and software, and may provide a wired or wireless network interface to a network. The user interface components 1514 may include, for example, a touchscreen, a display, one or more user input components (e.g., a keyboard, a mouse, etc.), a speaker, or the like, or any combination thereof. Graphics processed via the methods described herein may be displayed on one or more user interface components. The one or more secondary storage devices 1506 may be, for example, one or more hard drives or the like, and may store logic 1516 (e.g., application logic) to be executed by graphics processor(s) 1508 and/or general processor(s) 1502. In an embodiment, general processor(s) 1502 and/or graphics processor(s) 1508 may be microprocessors, and logic 1516 may be stored or loaded into memory 1504 for execution by general processor(s) 1502 and/or graphics processor(s) 1508 to provide the functions described herein. Note that while not shown, computing system 1500 may include additional components.

Figure 16:
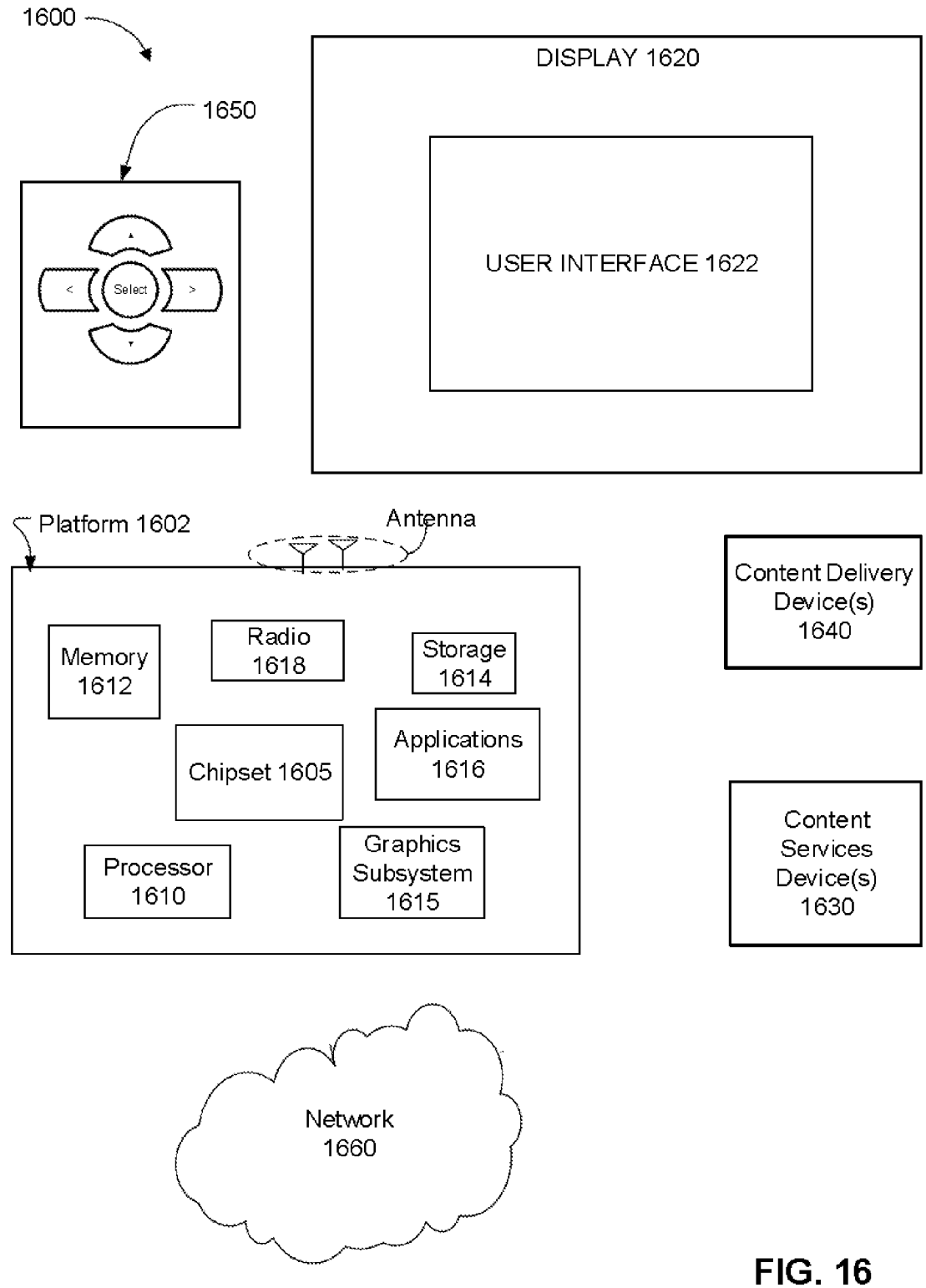
FIG. 16 illustrates an example information system in which an embodiment may be implemented.

The technology described above may be a part of a larger information system. FIG. 16 illustrates such an embodiment, as a system 1600. In embodiments, system 1600 may be a media system although system 1600 is not limited to this context. For example, system 1600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1600 comprises a platform 1602 coupled to a display 1620. Platform 1602 may receive content from a content device such as content services device(s) 1630 or content delivery device(s) 1640 or other similar content sources. A navigation controller 1650 comprising one or more navigation features may be used to interact with, for example, platform 1602 and/or display 1620. Each of these components is described in more detail below.

In embodiments, platform 1602 may comprise any combination of a chipset 1605, processor 1610, memory 1612, storage 1614, graphics subsystem 1615, applications 1616 and/or radio 1618. Chipset 1605 may provide intercommunication among processor 1610, memory 1612, storage 1614, graphics subsystem 1615, applications 1616 and/or radio 1618. For example, chipset 1605 may include a storage adapter (not depicted) capable of providing intercommunication with storage 1614.

Processor 1610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1610 may comprise dual-core processor(s), dual-core mobile processor(s), and so forth.

Memory 1612 may be implemented as a volatile memory device such as, but not limited to, a Random Access Memory (RAM), Dynamic Random Access Memory (DRAM), or Static RAM (SRAM).

Storage 1614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1614 may comprise technology to increase the storage performance enhanced protection for valuable digital media when multiple hard drives are included, for example.

Graphics subsystem 1615 may perform processing of images such as still or video for display. Graphics subsystem 1615 may be a graphics processing unit (GPU) or a visual processing unit (VPU), for example. An analog or digital interface may be used to communicatively couple graphics subsystem 1615 and display 1620. For example, the interface may be any of a High-Definition Multimedia Interface, DisplayPort, wireless HDMI, and/or wireless HD compliant techniques. Graphics subsystem 1615 could be integrated into processor 1610 or chipset 1605. Graphics subsystem 1615 could be a stand-alone card communicatively coupled to chipset 1605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 1618 may operate in accordance with one or more applicable standards in any version.

In embodiments, display 1620 may comprise any television type monitor or display. Display 1620 may comprise, for example, a computer display screen, touch screen display, video monitor, television-like device, and/or a television. Display 1620 may be digital and/or analog. In embodiments, display 1620 may be a holographic display. Also, display 1620 may be a transparent surface that may receive a visual projection. Such projections may convey various forms of information, images, and/or objects. For example, such projections may be a visual overlay for a mobile augmented reality (MAR) application. Under the control of one or more software applications 1616, platform 1602 may display user interface 1622 on display 1620.

In embodiments, content services device(s) 1630 may be hosted by any national, international and/or independent service and thus accessible to platform 1602 via the Internet, for example. Content services device(s) 1630 may be coupled to platform 1602 and/or to display 1620. Platform 1602 and/or content services device(s) 1630 may be coupled to a network 1660 to communicate (e.g., send and/or receive) media information to and from network 1660. Content delivery device(s) 1640 also may be coupled to platform 1602 and/or to display 1620.

In embodiments, content services device(s) 1630 may comprise a cable television box, personal computer, network, telephone, Internet enabled devices or appliance capable of delivering digital information and/or content, and any other similar device capable of unidirectionally or bidirectionally communicating content between content providers and platform 1602 and/display 1620, via network 1660 or directly. It will be appreciated that the content may be communicated unidirectionally and/or bidirectionally to and from any one of the components in system 1600 and a content provider via network 1660. Examples of content may include any media information including, for example, video, music, medical and gaming information, and so forth.

Content services device(s) 1630 receives content such as cable television programming including media information, digital information, and/or other content. Examples of content providers may include any cable or satellite television or radio or Internet content providers. The provided examples are not meant to limit embodiments of the invention.

In embodiments, platform 1602 may receive control signals from navigation controller 1650 having one or more navigation features. The navigation features of controller 1650 may be used to interact with user interface 1622, for example. In embodiments, navigation controller 1650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 1650 may be echoed on a display (e.g., display 1620) by movements of a pointer, cursor, focus ring, or other visual indicators displayed on the display. For example, under the control of software applications 1616, the navigation features located on navigation controller 1650 may be mapped to virtual navigation features displayed on user interface 1622, for example. In embodiments, controller 1650 may not be a separate component but integrated into platform 1602 and/or display 1620. Embodiments, however, are not limited to the elements or in the context shown or described herein.

In embodiments, drivers (not shown) may comprise technology to enable users to instantly turn on and off platform 1602 like a television with the touch of a button after initial boot-up, when enabled, for example. Program logic may allow platform 1602 to stream content to media adaptors or other content services device(s) 1630 or content delivery device(s) 1640 when the platform is turned "off." In addition, chipset 1605 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1600 may be integrated. For example, platform 1602 and content services device(s) 1630 may be integrated, or platform 1602 and content delivery device(s) 1640 may be integrated, or platform 1602, content services device(s) 1630, and content delivery device(s) 1640 may be integrated, for example. In various embodiments, platform 1602 and display 1620 may be an integrated unit. Display 1620 and content service device(s) 1630 may be integrated, or display 1620 and content delivery device(s) 1640 may be integrated, for example. These examples are not meant to limit the invention.

In various embodiments, system 1600 may be implemented as a wireless system, a wired system, or a combination of both. When implemented as a wireless system, system 1600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 16.

Figure 17:
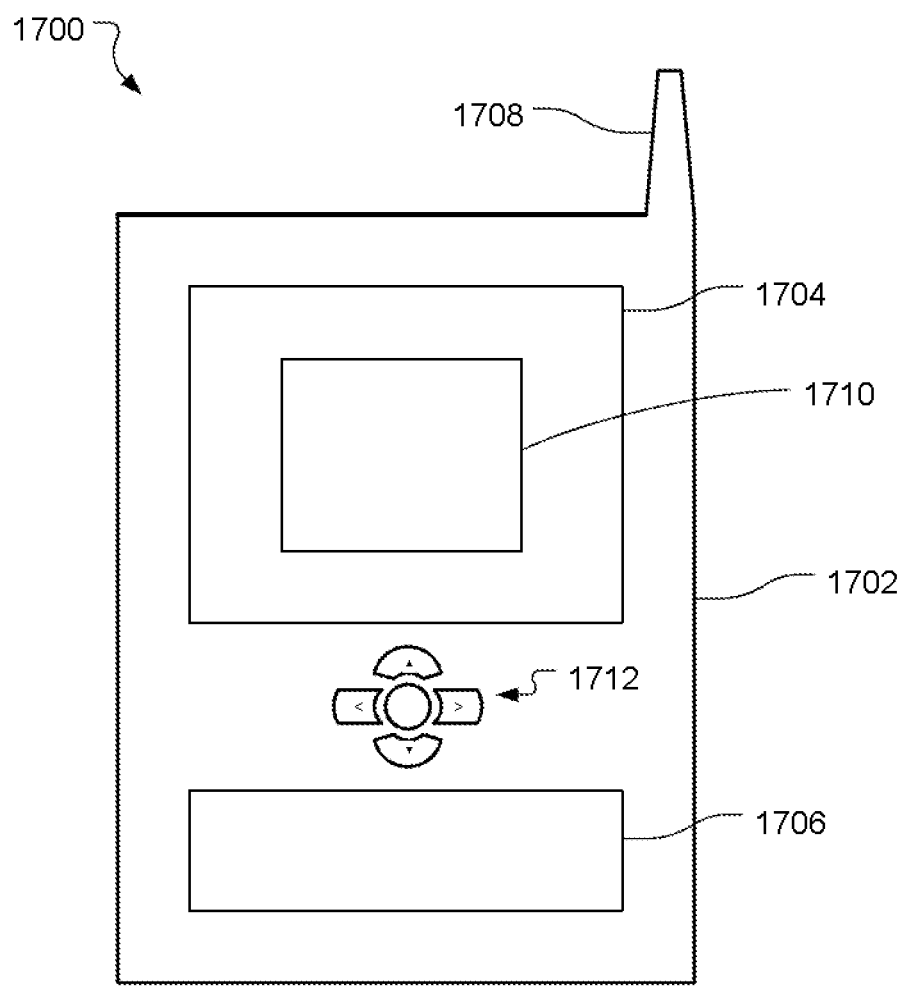
FIG. 17 illustrates an example mobile information device in which an embodiment may be implemented.

As described above, system 1600 may be embodied in varying physical styles or form factors. FIG. 17 illustrates embodiments of a small form factor device 1700 in which system 1600 may be embodied. In embodiments, for example, device 1700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 17, device 1700 may comprise a housing 1702, a display 1704, an input/output (I/O) device 1706, and an antenna 1708. Device 1700 also may comprise navigation features 1712. Display 1704 may comprise any suitable display unit for displaying information 1710 appropriate for a mobile computing device. I/O device 1706 may comprise any suitable I/O device for entering information into a mobile computing device. Examples for I/O device 1706 may include an alphanumeric keyboard, a numeric keypad, a touch pad, input keys, buttons, switches, rocker switches, microphones, speakers, voice recognition devices and software, and so forth. Information also may be entered into device 1700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Technologies disclosed herein utilize a primitive start pitch (PSP) time series to greatly improve graphics performance. A PSP time series may be used to enable the starting of graphics processing with a higher geometry preprocessing frequency and to lower it when necessary. The PSP time series may also be used to estimate frame length compression (i.e., bin gain) and to help determine when it is ideal to set the geometry preprocessing frequency to a higher setting (e.g., when the probability for an opportunity for bin gain is higher). In addition, the PSP time series may be used to power-gate graphics resources when not needed. The particular examples and scenarios used in this document are for ease of understanding and are not to be limiting. Features described herein may be used in many other contexts, as would be understood by one of ordinary skill in the art.

There are various advantages of using the technologies described herein. One advantage is that the dynamic frequency scaling described herein may provide power conservation that may serve to reduce power requirements in geometry preprocessing compared to when using a static scaling approach. Another advantage is that the technologies described herein may capture or take into account what may occur in special cases or events (I/O limits, etc.). In addition, by power-gating one or more of the streaming shader engine resources in the manner described herein, leakage may be reduced and power-performance efficiency may be increased. Many other advantages may also be contemplated.

The following examples pertain to further embodiments.
Frequency Scaling Examples Example 1 may include a graphics processing system, comprising: a graphics workload initialization unit configured to begin a graphics workload with a starting geometry preprocessing frequency of a multiple of a streaming shader engine frequency, wherein the multiple is non-zero; a primitive start pitch determination unit configured to determine a primitive start pitch for a primitive of the graphics workload, wherein the primitive start pitch is a count of streaming shader engine clocks for the primitive prior to the start of a next primitive; a comparison unit configured to compare the determined primitive start pitch to a predetermined threshold; and a geometry preprocessing frequency adjuster configured to, if the determined primitive start pitch exceeds the predetermined threshold, reduce the geometry preprocessing frequency to a reduced geometry preprocessing frequency, and at the start of the next primitive, set the geometry preprocessing frequency back to the starting geometry preprocessing frequency, wherein the primitive start pitch determination unit, comparison unit, and geometry preprocessing frequency adjuster unit are configured to continue to process each remaining primitive until an end of the graphics workload.

In Example 2, Example 1 may optionally include a first primitive start pitch counter configured to determine, for a given frame of the graphics workload, a first count of primitive start pitches less than or equal to a first predetermined primitive start pitch threshold; a second primitive start pitch counter configured to determine, for the given frame, a second count of primitive start pitches greater than the first predetermined primitive start pitch threshold and less than or equal to a second predetermined start pitch threshold; and a frame length compression determination unit configured to, at the end of the given frame, determine frame length compression based on the first count, the second count, a predetermined line model intercept, and a predetermined line model slope, wherein the geometry preprocessing frequency adjuster is configured to, if the determined frame length compression is below a predetermined frame length compression threshold, set the geometry preprocessing frequency to the reduced geometry preprocessing frequency for a given number of subsequent frames or until a start of a next scene.

Example 3 may include the subject matter of Example 2, wherein the frame length compression determination unit is configured to determine the frame length compression based on equation:

$$\text{Frame Length Compression} = [(\text{first count}/\text{second count}) - \text{intercept}]/\text{slope},$$

wherein the intercept and slope are predetermined via line modeling.

Example 4 may include the subject matter of any one of Examples 1-3, wherein the graphics workload initialization unit is configured to begin the graphics workload with one or more streaming shader engine resources power-gated, and wherein the system further comprises: a power-gating adjuster configured to, if a determined primitive start pitch exceeds a predetermined power-gating threshold, un-power-gate one or more of the power-gated streaming shader engine resources.

Example 5 may include the subject matter of Example 4, wherein the power-gating adjuster is further configured to, if a number of clock cycles from a start of an initial frame to when the predetermined power-gating threshold is exceeded is less than a predetermined minimum number of clock cycles, keep the streaming shader engine resources un-power-gated for a predetermined number of subsequent frames.

In Example 6, any one of Examples 1-5 may optionally include a processor; a communication interface in communication with the processor and a network; a memory in communication with the processor; a user interface including a navigation device and display, the user interface in communication with the processor; and storage that stores application logic, the storage in communication with the processor, wherein the processor is configured to load the application logic from the storage into the memory and execute the application logic, wherein the execution of the application logic includes presenting graphics via the user interface.

Example 7 may include at least one computer program product for graphics processing, including at least one computer readable medium having computer program logic stored therein, the computer program logic including: logic to cause a processor to begin a graphics workload with a starting geometry preprocessing frequency of a multiple of a streaming shader engine frequency, wherein the multiple is non-zero; logic to cause the processor to determine a primitive start pitch for a primitive of the graphics workload, wherein the primitive start pitch is a count of streaming shader engine clocks for the primitive prior to the start of a next primitive; logic to cause the processor to compare the determined primitive start pitch to a predetermined threshold; logic to cause the processor to, if the determined primitive start pitch exceeds the predetermined threshold, reduce the geometry preprocessing frequency to a reduced geometry preprocessing frequency, and at the start of the next primitive, set the geometry preprocessing frequency back to the starting geometry preprocessing frequency; and logic to cause the processor to repeat the determining and comparing of primitive start pitches, and adjusting of the geometry preprocessing frequency, for remaining primitives until an end of the graphics workload.

Example 8 may include the subject matter of Example 7, wherein the computer program logic further includes: logic to cause the processor to determine, for a given frame of the graphics workload, a first count of primitive start pitches less than or equal to a first predetermined primitive start pitch threshold; logic to cause the processor to determine, for the given frame, a second count of primitive start pitches greater than the first predetermined primitive start pitch threshold and less than or equal to a second predetermined start pitch threshold; logic to cause the processor to, at the end of the given frame, determine frame length compression based on the first count, the second count, a predetermined line model intercept, and a predetermined line model slope; and logic to cause the processor to, if the determined frame length compression is below a predetermined frame length compression threshold, set the geometry preprocessing frequency to the reduced geometry preprocessing frequency for a given number of subsequent frames or until a start of a next scene.

Example 9 may include the subject matter of Example 8, wherein the logic to determine frame length compression includes logic to determine frame length compression based on equation:

$$\text{Frame Length Compression} = [(\text{first count}/\text{second count}) - \text{intercept}]/\text{slope},$$

wherein the intercept and slope are predetermined via line modeling.

Example 10 may include the subject matter of any one of Examples 7-9, wherein the logic to begin the graphics workload includes logic to begin the graphics workload with one or more streaming shader engine resources power-gated, and wherein the computer program logic further includes: logic to cause the processor to, if a determined primitive start pitch exceeds a predetermined power-gating threshold, un-power-gating one or more of the power-gated streaming shader engine resources.

Example 11 may include the subject matter of Example 10, wherein the computer program logic further includes: logic to cause the processor to, if a number of clock cycles from a start of an initial frame to when the predetermined power-gating threshold is exceeded is less than a predetermined minimum number of clock cycles, keep the streaming shader engine resources un-power-gated for a predetermined number of subsequent frames.

Example 12 may include an apparatus for graphics processing, comprising: means for beginning a graphics workload with a starting geometry preprocessing frequency of a multiple of a streaming shader engine frequency, wherein the multiple is non-zero; means for determining a primitive start pitch for a primitive of the graphics workload, wherein the primitive start pitch is a count of streaming shader engine clocks for the primitive prior to the start of a next primitive; means for comparing the determined primitive start pitch to a predetermined threshold; means for adjusting the geometry preprocessing frequency, wherein, if the determined primitive start pitch exceeds the predetermined threshold, reducing the geometry preprocessing frequency to a reduced geometry preprocessing frequency, and at the start of the next primitive, setting the geometry preprocessing frequency back to the starting geometry preprocessing frequency; and means for repeating the determining, comparing, and adjusting for remaining primitives until an end of the graphics workload.

In Example 13, Example 12 may optionally include means for determining, for a given frame of the graphics workload, a first count of primitive start pitches less than or equal to a first predetermined primitive start pitch threshold; means for determining, for the given frame, a second count of primitive start pitches greater than the first predetermined primitive start pitch threshold and less than or equal to a second predetermined start pitch threshold; means for, at the end of the given frame, determining frame length compression based on the first count, the second count, a predetermined line model intercept, and a predetermined line model slope; and means for, if the determined frame length compression is below a predetermined frame length compression threshold, setting the geometry preprocessing frequency to the reduced geometry preprocessing frequency for a given number of subsequent frames or until a start of a next scene.

Example 14 may include the subject matter of Example 13, wherein the means for determining the frame length compression includes means for determining the frame length compression based on equation:

$$\text{Frame Length Compression} = [(\text{first count/second count}) - \text{intercept}]/\text{slope},$$

wherein the intercept and slope are predetermined via line modeling.

Example 15 may include the subject matter of any one of Examples 12-14, wherein the means for beginning the graphics workload includes means for beginning the graphics workload with one or more streaming shader engine resources power-gated, and wherein the apparatus further comprises: means for, if a determined primitive start pitch exceeds a predetermined power-gating threshold, un-power-gating one or more of the power-gated streaming shader engine resources.

In Example 16, Example 15 may optionally include means for, if a number of clock cycles from a start of an initial frame to when the predetermined power-gating threshold is exceeded is less than a predetermined minimum number of clock cycles, keeping the streaming shader engine resources un-power-gated for a predetermined number of subsequent frames.

Example 17 may include a method of optimizing graphics processing performance by a graphics processor, comprising: beginning, by the graphics processor, a graphics workload with a starting geometry preprocessing frequency of a multiple of a streaming shader engine frequency, wherein the multiple is non-zero; determining, by the graphics processor, a primitive start pitch for a primitive of the graphics workload, wherein the primitive start pitch is a count of streaming shader engine clocks for the primitive prior to the start of a next primitive; comparing, by the graphics processor, the determined primitive start pitch to a predetermined threshold and, if the determined primitive start pitch exceeds the predetermined threshold, reducing, by the graphics processor, the geometry preprocessing frequency to a reduced geometry preprocessing frequency, and at the start of the next primitive, setting, by the graphics processor, the geometry preprocessing frequency back to the starting geometry preprocessing frequency; and repeating the determining and comparing for each remaining primitive until an end of the graphics workload.

Example 18 may include the subject matter of Example 17, wherein the predetermined threshold is programmable and located in one or more of a hardware register, a software driver, or a lookup table, that are accessible by the graphics processor.

In Example 19, Example 17 or Example 18 may optionally include assessing other conditions to determine if the geometry preprocessing frequency needs to be reduced, wherein the other conditions involve one or more of maximum execution unit threads loaded, requests to last level caches (LLC), LLC misses, or indications of read/write traffic between the graphics processor and the LLC.

In Example 20, any one of Examples 17-19 may optionally include assessing other conditions to determine if the geometry preprocessing frequency needs to be reduced, wherein the other conditions involve one or more of utilization events or temperature information to optimize power consumption.

Example 21 may include the subject matter of any one of Examples 17-20, wherein the comparing includes comparing the determined primitive start pitch to the predetermined threshold and determining if an input/output (I/O) limit is reached, and if the I/O limit is reached or the determined primitive start pitch exceeds the predetermined threshold, proceeding to the reducing the geometry preprocessing frequency.

Example 22 may include the subject matter of any one of Examples 17-20, wherein the comparing includes comparing the determined primitive start pitch to the predetermined threshold, determining if an input/output (I/O) limit is reached, and determining if a maximum number of execution unit threads are loaded, and if the determined primitive start pitch exceeds the predetermined threshold, proceed to the reducing the geometry preprocessing frequency only if the I/O limit is reached or if the maximum number of execution unit threads are loaded.

In Example 23, any one of Examples 17-22 may optionally include determining, for a given frame of the graphics workload, a first count of primitive start pitches less than or equal to a first predetermined primitive start pitch threshold; determining, for the given frame, a second count of primitive start pitches greater than the first predetermined primitive start pitch threshold and less than or equal to a second predetermined start pitch threshold; at the end of the given frame, determining frame length compression based on the first count, the second count, a predetermined line model intercept, and a predetermined line model slope; and if the determined frame length compression is below a predetermined frame length compression threshold, setting the geometry preprocessing frequency to the reduced geometry preprocessing frequency for a given number of subsequent frames or until a start of a next scene.

Example 24 may include the subject matter of Example 23, wherein determination of the frame length compression is based on equation:

Frame Length Compression=[(first count/second count)−intercept]/slope, wherein the intercept and slope are predetermined via line modeling.

Example 25 may include the subject matter of any one of Examples 17-24, wherein the beginning the graphics workload includes beginning the graphics workload with one or more streaming shader engine resources power-gated, and wherein the method further comprises: if a determined primitive start pitch exceeds a predetermined power-gating threshold, un-power-gating one or more of the power-gated streaming shader engine resources.

In Example 26, Example 25 may optionally include, if a number of clock cycles from a start of an initial frame to when the predetermined power-gating threshold is exceeded is less than a predetermined minimum number of clock cycles, keeping the streaming shader engine resources un-power-gated for a predetermined number of subsequent frames.

Example 27 may include at least one machine readable medium comprising a plurality of instructions that in response to being executed on a computing device, cause the computing device to carry out a method according to any one of Examples 17-26.

Example 28 may include an apparatus configured to perform the method of any one of Examples 17-26.

Example 29 may include a computer system to perform the method of any one of Examples 17-26.

Example 30 may include a machine to perform the method of any one of Examples 17-26.

Example 31 may include an apparatus comprising means for performing the method of any one of Examples 17-26.

Example 32 may include a computing device comprising memory and a chipset configured to perform the method of any one of Examples 17-26.

Power-Gating Examples

Example 1 may include a graphics processing system, comprising: a graphics workload initialization unit configured to begin a graphics workload with one or more streaming shader engine resources power-gated; a primitive start pitch determination unit configured to determine a primitive start pitch for a primitive of the graphics workload, wherein the primitive start pitch is a count of streaming shader engine clocks for the primitive prior to the start of a next primitive; a comparison unit configured to compare the determined primitive start pitch to a predetermined threshold; and a power-gating adjuster configured to, if the determined primitive start pitch exceeds the predetermined threshold, un-power-gate one or more of the power-gated streaming shader engine resources until an end of frame is reached.

Example 2 may include the subject matter of Example 1, wherein the power-gating adjuster is further configured to, when the end of frame is reached, power-gate one or more of the streaming shader engine resources prior to processing of primitives continues at a next frame.

Example 3 may include the subject matter of Example 1, wherein the power-gating adjuster is further configured to, if a number of clock cycles from a start of frame to when the predetermined threshold is exceeded is less than a predetermined minimum number of clock cycles, keep the streaming shader engine resources un-power-gated for a predetermined number of subsequent frames.

Example 4 may include the subject matter of Example 1 or Example 2, wherein the primitive start pitch determination unit, comparison unit, and power-gating adjuster are further configured to, if a number of clock cycles from a start of frame to when the predetermined threshold is exceeded is not less than a predetermined minimum number of clock cycles, power-gate one or more of the streaming shader engine resources and continue to process each remaining primitive for a predetermined number of subsequent frames with adjustments as necessary by the power-gating adjuster.

Example 5 may include the subject matter of any one of Examples 1-4, wherein the graphics workload initialization unit is further configured to begin the graphics workload with a starting geometry preprocessing frequency of a multiple of a streaming shader engine frequency, wherein the multiple is non-zero, and wherein the system further comprises: a geometry preprocessing frequency adjuster configured to, if the determined primitive start pitch exceeds a predetermined frequency adjustment threshold, reduce the geometry preprocessing frequency to a reduced geometry preprocessing frequency, and at the start of a next primitive, set the geometry preprocessing frequency back to the starting geometry preprocessing frequency, wherein the primitive start pitch determination unit, comparison unit, and geometry preprocessing frequency adjuster unit are configured to continue to process each remaining primitive in this way until an end of the graphics workload.

In Example 6, Example 5 may optionally include a first primitive start pitch counter configured to determine, for a given frame of the graphics workload, a first count of primitive start pitches less than or equal to a first predetermined primitive start pitch threshold; a second primitive start pitch counter configured to determine, for the given frame, a second count of primitive start pitches greater than the first predetermined primitive start pitch threshold and less than or equal to a second predetermined start pitch threshold; and a frame length compression determination unit configured to, at the end of the given frame, determine frame length compression based on the first count, the second count, a predetermined line model intercept, and a predetermined line model slope, wherein the geometry preprocessing frequency adjuster is configured to, if the determined frame length compression is below a predetermined frame length compression threshold, set the geometry preprocessing frequency to the reduced geometry preprocessing frequency for a given number of subsequent frames or until a start of a next scene.

In Example 7, any one of Examples 1-6 may optionally include a processor; a communication interface in communication with the processor and a network; a memory in communication with the processor; a user interface including a navigation device and display, the user interface in communication with the processor; and storage that stores application logic, the storage in communication with the processor, wherein the processor is configured to load the application logic from the storage into the memory and execute the application logic, wherein the execution of the application logic includes presenting graphics via the user interface.

Example 8 may include at least one computer program product for graphics processing, including at least one computer readable medium having computer program logic stored therein, the computer program logic including: logic to cause a processor to begin a graphics workload with one or more streaming shader engine resources power-gated; logic to cause the processor to determine a primitive start pitch for a primitive of the graphics workload, wherein the primitive start pitch is a count of streaming shader engine clocks for the primitive prior to the start of a next primitive; logic to cause the processor to compare the determined primitive start pitch to a predetermined threshold; and logic to cause the processor to, if the determined primitive start pitch exceeds the predetermined threshold, un-power-gate one or more of the power-gated streaming shader engine resources until an end of frame is reached.

Example 9 may include the subject matter of Example 8, wherein the computer program logic further includes: logic to cause the processor to, when the end of frame is reached, power-gate one or more of the streaming shader engine resources prior to processing of primitives continues at a next frame.

Example 10 may include the subject matter of Example 8, wherein the computer program logic further includes: logic to cause the processor to, if a number of clock cycles from a start of frame to when the predetermined threshold is exceeded is less than a predetermined minimum number of clock cycles, keep the streaming shader engine resources un-power-gated for a predetermined number of subsequent frames.

Example 11 may include the subject matter of Example 8 or Example 9, wherein the computer program logic further includes: logic to cause the processor to, if a number of clock cycles from a start of frame to when the predetermined threshold is exceeded is not less than a predetermined minimum number of clock cycles, power-gate one or more of the streaming shader engine resources and continue to process each remaining primitive for a predetermined number of subsequent frames making power-gating adjustments as necessary.

Example 12 may include the subject matter of any one of Examples 8-11, wherein the computer program logic further includes: logic to cause the processor to begin the graphics workload with a starting geometry preprocessing frequency of a multiple of a streaming shader engine frequency, wherein the multiple is non-zero; logic to cause the processor to, if the determined primitive start pitch exceeds a predetermined frequency adjustment threshold, reduce the geometry preprocessing frequency to a reduced geometry preprocessing frequency, and at the start of a next primitive, set the geometry preprocessing frequency back to the starting geometry preprocessing frequency; and logic to cause the processor to process each remaining primitive in this way until an end of the graphics workload.

Example 13 may include the subject matter of Example 12, wherein the computer program logic further includes: logic to cause the processor to determine, for a given frame of the graphics workload, a first count of primitive start pitches less than or equal to a first predetermined primitive start pitch threshold; logic to cause the processor to determine, for the given frame, a second count of primitive start pitches greater than the first predetermined primitive start pitch threshold and less than or equal to a second predetermined start pitch threshold; logic to cause the processor to, at the end of the given frame, determine frame length compression based on the first count, the second count, a predetermined line model intercept, and a predetermined line model slope; and logic to cause the processor to, if the determined frame length compression is below a predetermined frame length compression threshold, set the geometry preprocessing frequency to the reduced geometry preprocessing frequency for a given number of subsequent frames or until a start of a next scene.

Example 14 may include an apparatus for graphics processing, comprising: means for beginning a graphics workload with one or more streaming shader engine resources power-gated; means for determining a primitive start pitch for a primitive of the graphics workload, wherein the primitive start pitch is a count of streaming shader engine clocks for the primitive prior to the start of a next primitive; means for comparing the determined primitive start pitch to a predetermined threshold; and means for, if the determined primitive start pitch exceeds the predetermined threshold, un-power-gating one or more of the power-gated streaming shader engine resources until an end of frame is reached.

In Example 15, Example 14 may optionally include means for, when the end of frame is reached, power-gating one or more of the streaming shader engine resources prior to processing of primitives continues at a next frame.

In Example 16, Example 14 may optionally include means for, if a number of clock cycles from a start of frame to when the predetermined threshold is exceeded is less than a predetermined minimum number of clock cycles, keeping the streaming shader engine resources un-power-gated for a predetermined number of subsequent frames.

In Example 17, Example 14 or Example 15 may optionally include means for, if a number of clock cycles from a start of frame to when the predetermined threshold is exceeded is not less than a predetermined minimum number of clock cycles, power-gating one or more of the streaming shader engine resources and continuing to process each remaining primitive for a predetermined number of subsequent frames making power-gating adjustments as necessary.

In Example 18, any one of Examples 14-17 may optionally include means for beginning the graphics workload with a starting geometry preprocessing frequency of a multiple of a streaming shader engine frequency, wherein the multiple is non-zero; means for, if the determined primitive start pitch exceeds a predetermined frequency adjustment threshold, reducing the geometry preprocessing frequency to a reduced geometry preprocessing frequency; and at the start of a next primitive, setting the geometry preprocessing frequency back to the starting geometry preprocessing frequency; and means for processing each remaining primitive in this way until an end of the graphics workload.

In Example 19, Example 18 may optionally include means for determining, for a given frame of the graphics workload, a first count of primitive start pitches less than or equal to a first predetermined primitive start pitch threshold; means for determining, for the given frame, a second count of primitive start pitches greater than the first predetermined primitive start pitch threshold and less than or equal to a second predetermined start pitch threshold; means for, at the end of the given frame, determining frame length compression based on the first count, the second count, a predetermined line model intercept, and a predetermined line model slope; and means for, if the determined frame length compression is below a predetermined frame length compression threshold, setting the geometry preprocessing frequency to the reduced geometry preprocessing frequency for a given number of subsequent frames or until a start of a next scene.

Example 20 may include a method of optimizing graphics processing performance by a graphics processor, comprising: beginning, by the graphics processor, a graphics workload with one or more streaming shader engine resources power-gated; determining, by the graphics processor, a primitive start pitch for a primitive of the graphics workload, wherein the primitive start pitch is a count of streaming shader engine clocks for the primitive prior to the start of a next primitive; comparing, by the graphics processor, the determined primitive start pitch to a predetermined threshold; and if the determined primitive start pitch exceeds the predetermined threshold, un-power-gating, by the graphics processor, one or more of the power-gated streaming shader engine resources until an end of frame is reached.

In Example 21, Example 20 may optionally include, when the end of frame is reached, power-gating one or more of the streaming shader engine resources prior to processing of primitives continues at a next frame.

In Example 22, Example 20 may optionally include, if a number of clock cycles from a start of frame to when the predetermined threshold is exceeded is less than a predetermined minimum number of clock cycles, keeping the streaming shader engine resources un-power-gated for a predetermined number of subsequent frames.

In Example 23, Example 20 or Example 21 may optionally include, if a number of clock cycles from a start of frame to when the predetermined threshold is exceeded is not less than a predetermined minimum number of clock cycles, power-gating one or more of the streaming shader engine resources and continuing to process each remaining primitive for a predetermined number of subsequent frames making power-gating adjustments as necessary.

In Example 24, any one of Examples 20-23 may optionally include beginning the graphics workload with a starting geometry preprocessing frequency of a multiple of a streaming shader engine frequency, wherein the multiple is non-zero; if the determined primitive start pitch exceeds a predetermined frequency adjustment threshold, reducing the geometry preprocessing frequency to a reduced geometry preprocessing frequency, and at the start of a next primitive, setting the geometry preprocessing frequency back to the starting geometry preprocessing frequency; and processing each remaining primitive in this way until an end of the graphics workload.

In Example 25, Example 24 may optionally include determining, for a given frame of the graphics workload, a first count of primitive start pitches less than or equal to a first predetermined primitive start pitch threshold; determining, for the given frame, a second count of primitive start pitches greater than the first predetermined primitive start pitch threshold and less than or equal to a second predetermined start pitch threshold; at the end of the given frame, determining frame length compression based on the first count, the second count, a predetermined line model intercept, and a predetermined line model slope; and if the determined frame length compression is below a predetermined frame length compression threshold, setting the geometry preprocessing frequency to the reduced geometry preprocessing frequency for a given number of subsequent frames or until a start of a next scene.

Example 26 may include the subject matter of Example 25, wherein determining the frame length compression is based on equation:

Frame Length Compression=[(first count/second count)−intercept]/slope, wherein the intercept and slope are predetermined via line modeling.

Example 27 may include at least one machine readable medium comprising a plurality of instructions that in response to being executed on a computing device, cause the computing device to carry out a method according to any one of Examples 20-26.

Example 28 may include an apparatus configured to perform the method of any one of Examples 20-26.

Example 29 may include a computer system to perform the method of any one of Examples 20-26.

Example 30 may include a machine to perform the method of any one of Examples 20-26.

Example 31 may include an apparatus comprising means for performing the method of any one of Examples 20-26.

Example 32 may include a computing device comprising memory and a chipset configured to perform the method of any one of Examples 20-26.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the scope of the methods and systems disclosed herein. Thus, the breadth and scope of the claims should not be limited by any of the embodiments disclosed herein.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

What is claimed is:

1. A method, comprising:
   pre-processing data in a graphics processor at a first clock frequency;
   post-processing the data across multiple slices of the graphics processor, subsequent to the pre-processing, at a second clock frequency; and
   controlling a difference between the first and second clock frequencies based on a workload of the post-processing.

2. The method of claim 1, wherein the post-processing includes post-processing graphics primitives, and wherein the controlling includes:
   selectively adjusting the difference between the first and second clock frequencies during post-processing of graphics primitives of a frame based on post-processing start times of a subset of the graphics primitives of the frame.

3. The method of claim 2, wherein the selectively adjusting includes:
   adjusting the difference between the first and second clock frequencies during the post-processing of graphics primitives of the frame if a difference between post-processing start times of first and second consecutive graphics primitives of the frame exceeds a threshold.

4. The method of claim 3, wherein the controlling further includes:
   setting the difference between the first and second clock frequencies to an initial value at a start of the post-processing of the graphics primitives of the frame;
   computing an estimated frame length compression metric based on a difference between post-processing start times of each of multiple sets of consecutive graphics primitives of the frame;
   maintaining an adjusted difference between the first and second clock frequencies for a subsequent frame if the estimated frame length compression metric is below a threshold; and
   resetting the difference between the first and second clock frequencies to the initial value for the subsequent frame if the estimated frame length compression metric is above the threshold.

5. The method of claim 4, wherein the computing an estimated frame length compression metric includes:

computing a difference between post-processing start times of each of multiple pairs of consecutive graphics primitives of the frame;

assigning each computed difference to one of multiple bins based on the respective computed difference;

summing the computed differences assigned to each bin; and computing the estimated frame length compression metric based on the summed differences of the bins.

6. The method of claim 5, wherein the computing the estimated frame length compression metric includes:

computing a ratio of sums of the bins;

computing the estimated frame length compression metric based on the ratio.

7. The method of claim 1, wherein:

the post-processing includes performing a shader operation across the multiple slices of the graphics processor at the second clock frequency;

the controlling includes selectively adjusting the first clock frequency based on the workload of the post-processing to control the difference between the first and second clock frequencies; and the pre-processing includes operating a command streamer at the first clock frequency.

8. The method of claim 1, wherein the post-processing includes post-processing graphics primitives, and wherein the controlling includes selectively adjusting the difference between the first and second clock frequencies during post-processing of graphics primitives of a frame based on a combination of post-processing start times of graphics primitives of the frame, and one or more of, a number of execution unit threads loaded on the graphics processor, a number of requests from the graphics processor to a last level cache, a number of misses with respect to the requests, input/output traffic between the graphics processor and the last level cache, utilization of an execution unit floating point pipe of the graphics processor, utilization of a sampler of the graphics processor, utilization of an internal cache of the graphics processor, temperature information of the graphics processor, and voltage levels within the graphics processor.

9. An apparatus, comprising, a graphics processor configured to:

a pre-processor to pre-process data at a first clock frequency; and a post-processor to post-process the data across multiple slices of the post-processor, subsequent to the pre-processing, at a second clock frequency;

wherein the graphics processor is configured to control a difference between the first and second clock frequencies based on a workload of the post-processor.

10. The apparatus of claim 9, wherein the graphics processor is further configured to:

selectively adjust the difference between the first and second clock frequencies during processing of graphics primitives of a frame based on post-processing start times of a subset of the graphics primitives of the frame.

11. The apparatus of claim 10, wherein the controller is further configured to:

adjust the difference between the first and second clock frequencies during processing of graphics primitives of the frame if a difference between post-processing start times of first and second consecutive graphics primitives of the frame exceeds a first threshold.

12. The apparatus of claim 10, wherein the graphics processor is further configured to:

set the difference between the first and second clock frequencies to an initial value at a start of the post-processing of the graphics primitives of the frame;

compute an estimated frame length compression metric based on a difference between post-processing start times of each of multiple sets of consecutive graphics primitives of the frame;

maintain an adjusted difference between the first and second clock frequencies for a subsequent frame if the estimated frame length compression metric is below a threshold; and reset the difference between the first and second clock frequencies to the initial value for the subsequent frame if the estimated frame length compression metric is above the threshold.

13. The apparatus of claim 12, wherein the graphics processor is further configured to:

compute a difference between post-processing start times of each of multiple pairs of consecutive graphics primitives of the frame;

assign each computed difference to one of multiple bins based on the respective computed difference;

sum the computed differences assigned to each bin; and compute the estimated frame length compression metric based on the summed differences of the bins.

14. The apparatus of claim 13, wherein the graphics processor is further configured to:

compute a ratio of sums of the bins; and compute the estimated frame length compression metric based on the ratio.

15. The apparatus of claim 9, wherein:

the post-processor is configured to perform a shader operation across the multiple slices of the post-processor at the second clock frequency;

the graphics processor is further configured to selectively adjust the first clock frequency based on the workload of the post-processor to control the difference between the first and second clock frequencies;

the pre-processor includes a command streamer; and the graphics processor is further configured to operate the command streamer at the first clock frequency.

16. A non-transitory computer readable medium encoded with a computer program that includes instructions to cause a graphics processor to:

pre-process data at a first clock frequency;

post-process the data across multiple slices of the graphics processor, subsequent to the pre-processing, at a second clock frequency; and control a difference between the first and second clock frequencies based on a post-process workload.

17. The non-transitory computer readable medium of claim 16, further including instructions to cause the graphics processor to:

post-processing graphics primitives; and selectively adjust the difference between the first and second clock frequencies during post-processing of graphics primitives of a frame based on post-processing start times of a subset of the graphics primitives of the frame.

18. The non-transitory computer readable medium of claim 16, further including instructions to cause the graphics processor to:

adjust the difference between the first and second clock frequencies during post-processing of graphics primitives of the frame if a difference between post-processing start times of first and second consecutive graphics primitives of the frame exceeds a threshold.

19. The non-transitory computer readable medium of claim 17, further including instructions to cause the graphics processor to:
    set the difference between the first and second clock frequencies to an initial value at a start of the post-processing of the graphics primitives of the frame;
    compute an estimated frame length compression metric based on a difference between post-processing start times of each of multiple sets of consecutive graphics primitives of the frame;
    maintain an adjusted difference between the first and second clock frequencies for a subsequent frame if the estimated frame length compression metric is below a threshold; and
    reset the difference between the first and second clock frequencies to the initial value for the subsequent frame if the estimated frame length compression metric is above the threshold.

20. The non-transitory computer readable medium of claim 19, further including instructions to cause the graphics processor to:
    compute a difference between post-processing start times of each of multiple pairs of consecutive graphics primitives of the frame;
    assign each computed difference to one of multiple bins based on the respective computed difference;
    sum the computed differences assigned to each bin; and
    compute the estimated frame length compression metric based on the summed differences of the bins.

21. The non-transitory computer readable medium of claim 16, further including instructions to cause the graphics processor to:
    perform a shader operation across the multiple slices of the post-processor at the second clock frequency;
    selectively adjust the first clock frequency based on the post-process workload to control the difference between the first and second clock frequencies; and
    operate a command streamer at the first clock frequency.

* * * * *